(12) United States Patent
Greason

(10) Patent No.: US 12,209,576 B2
(45) Date of Patent: *Jan. 28, 2025

(54) PLASMA PROPULSION SYSTEMS AND ASSOCIATED SYSTEMS AND METHODS

(71) Applicant: Electric Sky Holdings, Inc., Mercer Island, WA (US)

(72) Inventor: Jeffrey Greason, Midland, TX (US)

(73) Assignee: Electric Sky Holdings, Inc., Mercer Island, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,502

(22) Filed: Oct. 2, 2023

(65) Prior Publication Data

US 2024/0175428 A1    May 30, 2024

Related U.S. Application Data

(63) Continuation of application No. 17/117,049, filed on Dec. 9, 2020, now Pat. No. 11,939,966.

(60) Provisional application No. 62/948,747, filed on Dec. 16, 2019, provisional application No. 62/945,856, filed on Dec. 9, 2019.

(51) Int. Cl.
*F03H 1/00* (2006.01)
*B64G 1/40* (2006.01)

(52) U.S. Cl.
CPC .......... *F03H 1/0018* (2013.01); *B64G 1/405* (2013.01); *B64G 1/413* (2023.08); *F03H 1/0081* (2013.01); *F03H 1/0025* (2013.01)

(58) Field of Classification Search
CPC ........ B64G 1/413; B64G 1/417; B64G 1/405; F03H 1/0018; F03H 1/0081–0093
See application file for complete search history.

(56) References Cited

U.S. PATENT DOCUMENTS

| | | |
|---|---|---|
| 2,939,648 A | 6/1960 | Fleissner |
| 2,992,345 A | 7/1961 | Hansen |

(Continued)

OTHER PUBLICATIONS

Lu et al., Rotating Detonation Wave Propulsion: Experimental Challenges, Modeling, and Engine Concepts, Journal of Propulsion and Power, vol. 30, No. 5, Sep.-Oct. 2014, 18 pages.**

(Continued)

*Primary Examiner* — Arun Goyal
*Assistant Examiner* — William L Breazeal
(74) *Attorney, Agent, or Firm* — Perkins Coie LLP

(57) ABSTRACT

The present technology is directed to plasma systems and associated methods, including propulsion systems for flight vehicles. A representative system includes a plurality of coils. The coils include a first coil positioned along a force axis, a second coil positioned along the force axis and spaced apart from the first coil, and a third coil that is magnetically shielded. A controller is operatively coupled to the coils and is configured to (a) increase energy to the first coil to generate a magnetic field in a portion of the plasma adjacent to the first coil, (b) decrease energy to the first coil and increase energy to the second coil to translate the resulting superposed magnetic field through the plasma to a position adjacent the second coil, and (c) transfer energy from the second coil to the third coil and decrease energy to the second coil to reduce the magnetic field in the plasma.

28 Claims, 15 Drawing Sheets

(56) References Cited

U.S. PATENT DOCUMENTS

| | | | |
|---|---|---|---|
| 3,114,517 | A | 12/1963 | Brown |
| 4,754,601 | A | 7/1988 | Minovitch |
| 4,825,646 | A | 2/1989 | Challoner et al. |
| 5,058,833 | A | 10/1991 | Carmouche |
| 5,305,974 | A | 4/1994 | Willis |
| 5,676,333 | A | 10/1997 | Rethorst |
| 5,797,563 | A | 8/1998 | Blackburn et al. |
| 6,488,233 | B1 | 2/2002 | Myroba |
| 6,527,221 | B1 | 3/2003 | Kremeyer |
| 6,793,177 | B2 | 9/2004 | Bonutti |
| 7,063,288 | B1 | 6/2006 | Kremeyer |
| 7,648,100 | B2 | 1/2010 | Kremeyer et al. |
| 8,511,612 | B2 | 8/2013 | Kremeyer |
| 9,920,706 | B1 | 3/2018 | Yavid |
| 11,014,651 | B1 | 5/2021 | Greason |
| 11,077,938 | B1 | 8/2021 | Greason |
| 11,939,966 | B2 * | 3/2024 | Greason ............... F03H 1/0018 |
| 2008/0093506 | A1 | 4/2008 | Emsellem |
| 2008/0290218 | A1 | 11/2008 | Schwimley et al. |
| 2012/0312923 | A1 | 12/2012 | Chang |
| 2013/0175405 | A1 | 7/2013 | Khozikov |
| 2014/0013724 | A1 | 1/2014 | Fetta |
| 2014/0153592 | A1 | 6/2014 | Nishikata et al. |
| 2016/0115946 | A1 | 4/2016 | Slough |
| 2017/0104426 | A1 | 4/2017 | Mills |
| 2019/0154013 | A1 | 5/2019 | Lazarev |
| 2019/0193843 | A1 | 6/2019 | Kikuchi |
| 2020/0039646 | A1 | 2/2020 | Fuller |
| 2020/0195057 | A1 | 6/2020 | Greason |
| 2020/0295522 | A1 | 9/2020 | Whitney et al. |
| 2022/0161945 | A1 | 5/2022 | Torre et al. |

OTHER PUBLICATIONS

Seebass et al., "Sonic Boom Minimization," Paper presented at the RTO AVT Course on Fluid Dynamics Research on Supersonic Aircraft, Rhode-Saint-Genese, Belgium, May 25-29, 1998, 13 pages.**

Wu et al., An Analytical Theory of Heated Duct Flows in Supersonic Combustors, Theoretical and Applied Mechanics Letters, 2014, 5 pages.**

Cohen et al., "Ion Heating in the Field-Reversed Confirguation by Rotating Magnetic Fields near the Ion-Cyclotron Resonance," Physical Review Letters, vol. 85, No. 24, Dec. 2000, 5 pages **

HyperPhysics, "Electricity and Magnetism," https://web.archive.org/web/20170209160305/http://hyperphysics.phy-astr.gsu.edu/hbase/magnetic/elemag.html, accessed Mar. 24, 2023, 5 pages.**

Waldock, Jamie, Electromagnetic Optimization of FRC-Based Pulsed Plasma Thusters, The 33rd International Electric Propulsion Conference, The George Washington University, Oct. 6-10, 2013, 14 pages.**

Young et al., "Advanced Concepts: Enabling Future AF Missions Through the Discovery of Demonstration of Emerging Revolutionary Technologies—In-House Final Report" Air Force Research Laboratory Aerospace Systems Directorate, Oct. 2012, 77 pages.**

Freund et al., "Lasers, Free-Electron," Encyclopedia of Physical Science and Technology, third edition, https://www.sciencedirect.com/science/article/abs/pii/B0122274105003677, 2001, 22 pages.

Gulliford et al., "Measurement of the per cavity energy recovery efficiency in the single turn Cornell-Brookhaven ERL Test Accelerator configuration," by C., Physical Review Accelerators and Beams 24, 010101, https://journals.aps.org/prab/abstract/10.1103/PhysRevAccelBeams.24.010101, 2021, 9 pages.

Whitney et al., "Airborne megawatt class free-electron laser for defense and security," Proceedings vol. 5792, Laser Source and System Technology for Defense and Security, and accessible at https://www.spiedigitallibrary.org/conference-proceedings-of-spie/5792/0000/Airborne-megawatt-class-free-electron-laser-for-defense-and-security/10.1117/12.603906.short, 2005, 12 pages.

Zen et al., "Record high extraction efficiency of free electron laser oscillator," Applied Physics Express 13 102007 on behalf of The Japan Society of Applied Physics by IOP Publishing Ltd., https://iopscience.iop.org/article/10.35848/1882-0786/abb690, 2020, 5 pages.

International Search Report and Written Opinion for International Patent Application No. PCT/US20/64131, Applicant: Electric Sky Holdings, Inc., mailed Sep. 24, 2021, 10 pages.

* cited by examiner

| Lower Atmosphere (troposphere/stratosphere/mesosphere) (virtually all neutral particles; negligible ambient ions) | Ionosphere (plentiful ambient ions; thousands of neutral particles for each ion) | Interplanetary & Interstellar Space (virtually all ions, few if any neutral particles) |
|---|---|---|
| The vehicle adds ions by ionizing some neutral particles. These ions push on the remaining neutral particles. The neutral particles generate virtually all of the thrust (the thrust from the ions alone is negligible) | The magnetic field pushes on the ions, the ions push on the neutral particles, and altogether they generate thrust | The magnetic field pushes on the ions, and the ions generate thrust (there are virtually no neutral particles to contribute to thrust). The plasma is far thinner than in the Earth's atmosphere, so larger fields are required |

*FIG. 2*

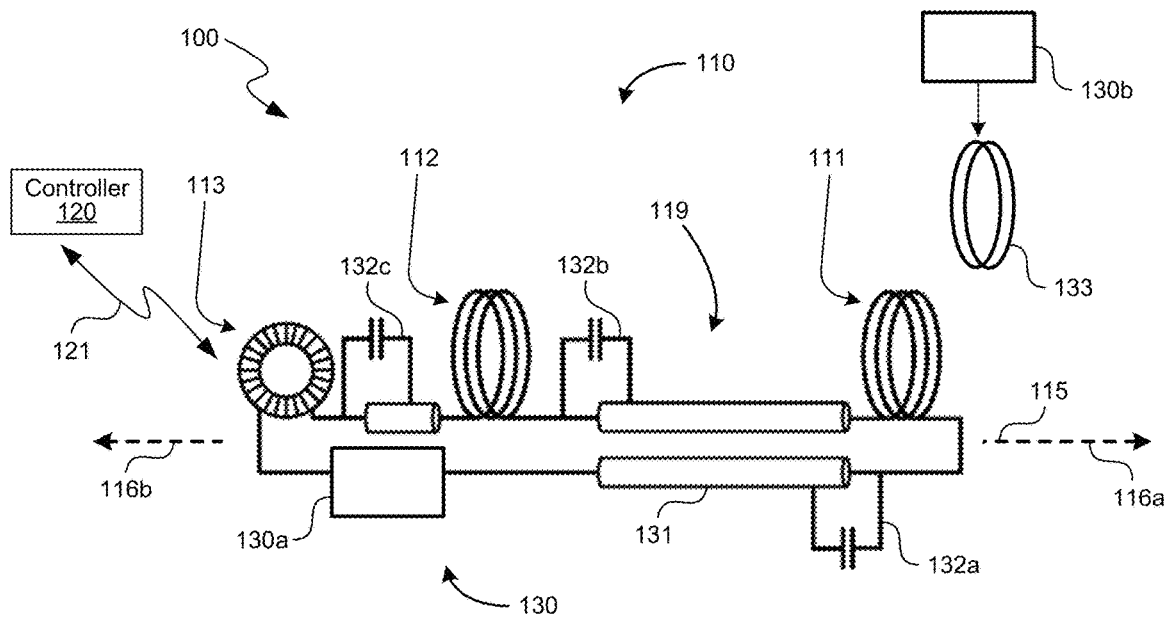

*FIG. 3A*

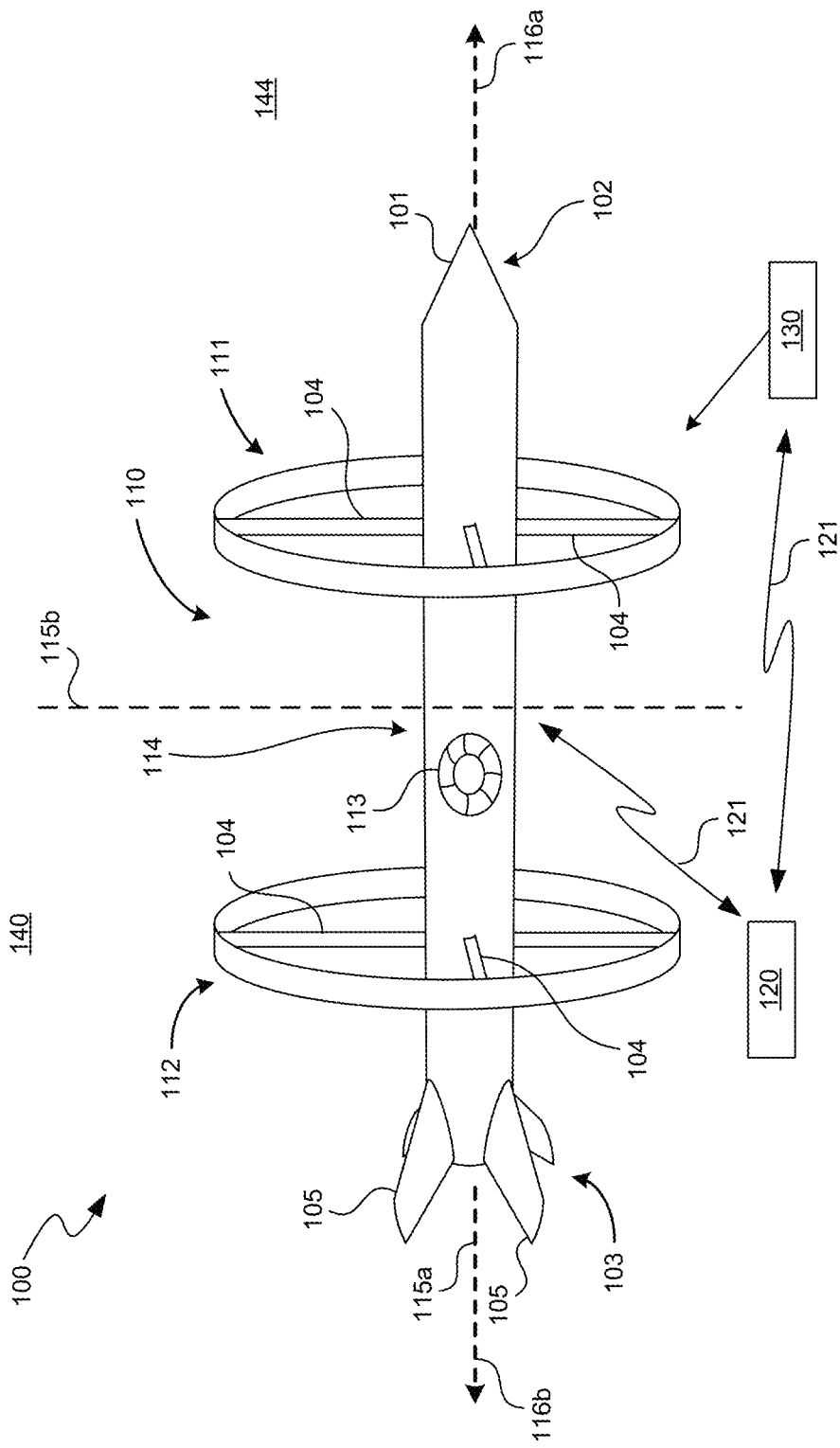

PLASMA PROPULSION SYSTEMS AND ASSOCIATED SYSTEMS AND METHODS

CROSS-REFERENCE TO RELATED APPLICATIONS

The present application is a continuation of U.S. patent application Ser. No. 17/117,049, filed Dec. 9, 2020, which claims priority to U.S. provisional application No. 62/945,856, filed on Dec. 9, 2019 and U.S. provisional application No. 62/948,747, filed on Dec. 16, 2019. The foregoing applications are incorporated herein by reference.

TECHNICAL FIELD

The present technology is directed generally to accelerating ions in a plasma field, for example, to propel a vehicle in a planet's (such as the Earth's) magnetosphere or ionosphere, and/or in an artificially created plasma field, and associated systems and methods. Representative implementations include cyclically energizing and de-energizing multiple coils to accelerate charged and uncharged particles.

BACKGROUND

Multiple propulsion techniques have been used for decades to launch vehicles into space. The most common technique has been rocket propulsion via combusting hydrogen or hydrocarbon fuels, although other techniques, including electrohydrodynamics have also been investigated. Despite the efforts spent to date, there remains a need for efficient and cost-effective propulsion techniques suitable for travel to and within the Earth's ionosphere, and for travel to terrestrial locations and/or beyond.

BRIEF DESCRIPTION OF THE DRAWINGS

FIG. 2 is a table illustrating representative operational modes for propulsion devices operating in different atmospheric layers, in accordance with embodiments of the present technology.

FIG. 3A is a schematic illustration of representative components used in accordance with embodiments of the presently disclosed technology.

FIG. 4A is a partially schematic illustration of a representative flight vehicle, in accordance with embodiments of the present technology.

DETAILED DESCRIPTION

1. Introduction

The present technology is directed generally to systems and methods for accelerating clouds of ionized gas, such as for propelling vehicles in an ionized atmosphere or other ionized environment. The ionized atmosphere can be naturally occurring, such as the Earth's (and/or another planet's) ionosphere, and environments in which solar wind is present. These techniques can also be used in a neutral atmosphere, such as near the Earth's surface, by using additional power to ionize the atmosphere around the vehicle. These techniques cause a flow of a reaction mass, such as air surrounding a vehicle, thereby generating thrust. Below the ionosphere, the external flow can be close to the vehicle, which moves a reaction mass composed of a small column of weakly ionized air for thrusting in the lower atmosphere. The external flow can also be generated at long distances from the vehicle. For example, in the ionosphere these techniques can generate a column of moving air kilometers in diameter, achieving a reaction mass flow sufficient to thrust the vehicle in the thin upper atmosphere. A representative embodiment of the technology includes cyclically energizing and de-energizing multiple coils to accelerate particles and produce thrust (and/or other forces), which can address limitations associated with conventional propulsion techniques, including combustion and electrohydrodynamics (EHD).

The present detailed description is organized under four headings: Heading 1 (Introduction), Heading 2 (Plasma Propulsion—Representative Embodiments), Heading 3 (Further Embodiments), and Heading 4 (Published References). Topics described under any of the foregoing headings may have application to topics discussed under any of the other headings. Accordingly, embodiments described under one heading may be combined with embodiments described under any other heading.

Figure 1:
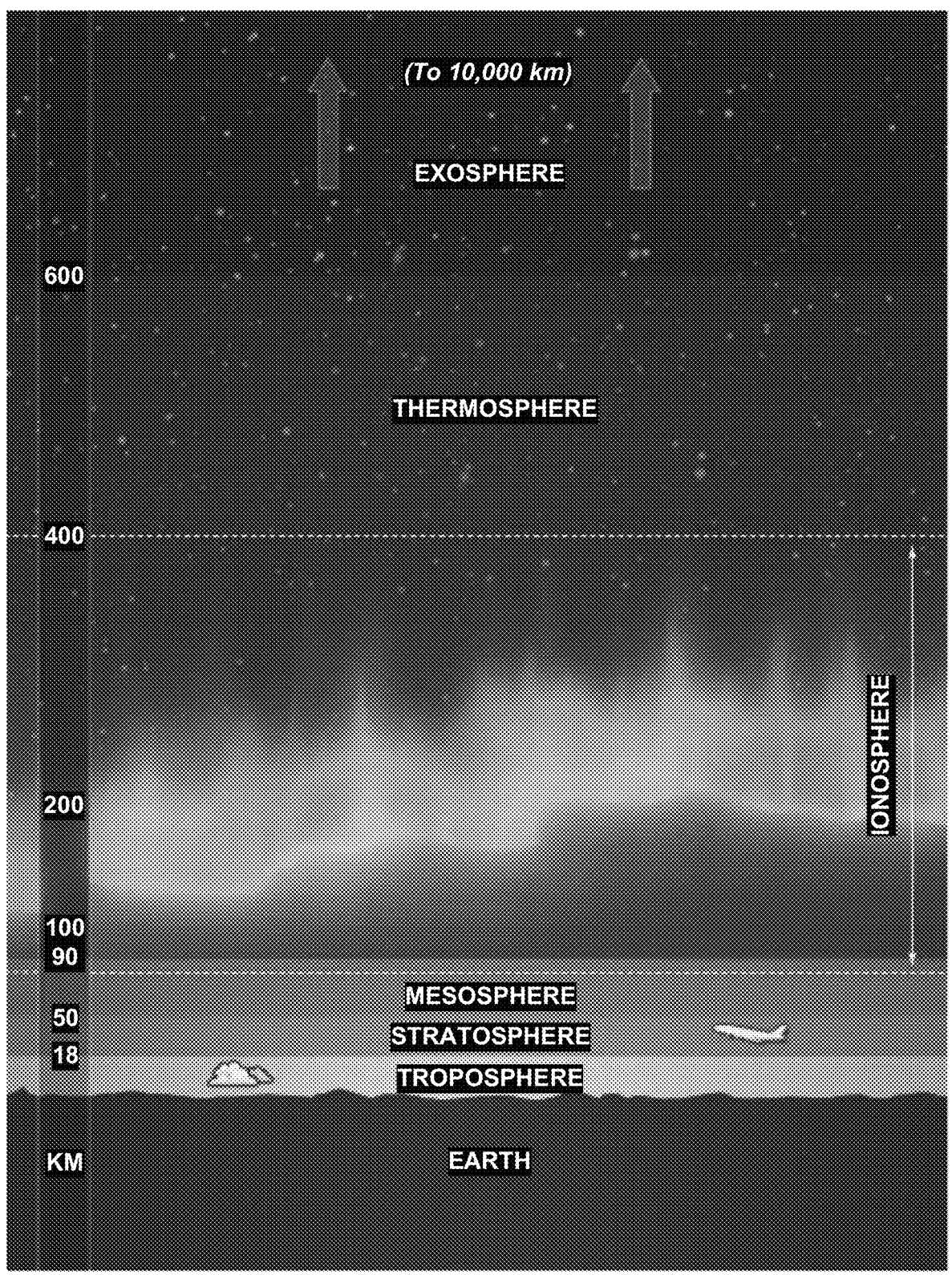
FIG. 1 illustrates the atmospheric layers surrounding the Earth, including the ionosphere, in which propulsion systems in accordance with embodiments of the present technology are configured to operate.

FIG. 1 is a schematic illustration of the layers surrounding the Earth's surface. As described further below, air-breathing propulsion is typically used in the troposphere and the stratosphere, satellite and rocket propulsion techniques are typically used to propel a vehicle above the stratosphere, and other conventional propulsion techniques, for example electrohydrodynamics (EHD) used at a variety of altitudes. Embodiments of the present technology have application in the troposphere and all layers above the troposphere, as will be discussed further below.

Many embodiments of the technology described below may take the form of computer- or machine- or controller-executable instructions, including routines executed by a programmable computer or controller. Those skilled in the relevant art will appreciate that the technology can be practiced on computer/controller systems other than those shown and described below. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a liquid crystal display (LCD). The term "controller" can also refer to an analog controller, that operates via analog inputs, with or without augmentation from a digital logic device.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

A. Combustion

The energy density of liquid fuels (such as petroleum, other fossil fuels such as liquefied natural gas, and hydrogen) is high enough that the fuels can be stored on-board the flight vehicle. Many propulsion methods for aircraft involve some form of combustion, in which air is used to provide the oxidizer to combust fuel and provide mechanical power. So-called "air-breathing" engines use that power to push on atmospheric air as a reaction mass. Air can be pushed mechanically by turning a propeller or fan, or by a combination of mechanical devices and combustion flow in a turbofan jet engine, or by combustion alone in a ramjet or scramjet engine.

So-called "air-breathing" combustion becomes impractical at higher altitudes. The higher the altitude, the thinner the air, so there is less mass to react per unit of volume. Propeller and/or fan diameters must be larger to push the thinner air, and jet intake manifolds must be wider to capture enough air to feed the ongoing combustion process. As altitude increases, each additional unit of weight adds a smaller unit of thrust. Air-breathing combustion engines become impractical at altitudes above ~27 km/90,000 feet. At such altitudes, the enlarged fan diameter or ram-jet intake adds a significant weight, posing serious performance limitations. As a result, conventional "air-breathing" combustion-based aircraft are confined to their current altitudes by the limitations of their combustion engines, not by the limitations of their aerodynamic surfaces.

B. Electrohydrodynamics (EHD)

Various efforts have been made to use electrohydrodynamic (EHD) or other grid methods to create ionic wind for propulsion in the Earth's atmosphere. As one Wikipedia article noted, "[c]urrent designs do not produce sufficient thrust for manned flight or useful loads." See Wikipedia, "Ion-propelled aircraft" (as accessed 24 Nov. 2019). Accordingly, these techniques remain inadequate.

C. Satellite Propulsion

As described above, propulsion at altitudes above ~27 km/90,000 feet often requires carrying some form of reaction mass onboard the flight vehicle, then accelerating this reaction mass away from the vehicle at high speed. At these higher altitudes, chemical combustion propulsion often requires some form of rocket, which carries an oxidizer onboard the vehicle. At even higher altitudes, such as satellites in low Earth orbit, onboard reaction mass (such as some form of hydrazine) can be heated in a chemical reaction and expanded in a nozzle for thrust. Satellites can also carry a reaction mass that is electromagnetically accelerated to create thrust, such as xenon or krypton in a Hall effect thruster or an ion thruster. Carrying a reaction mass onboard the vehicle can limit the operating life of the vehicle, as this form of propulsion ceases to operate once the onboard reaction mass is depleted. Space-launch vehicles are capable of transiting all levels of the atmosphere but (to minimize gross liftoff weight) deplete the onboard propellant quickly, typically in far less than one hour. As a result, satellite total size and weight (and, with it, satellite propellant load) is severely limited, which limits the ability for satellites to maneuver and to maintain lower-altitude orbits.

Satellites moving at orbital speed carry high momentum. To maneuver the satellite, one must exert a force to overcome this momentum, typically some form of thrust. If the satellite carries its reaction mass onboard, the propulsion system expends propellant with each maneuver, such that each maneuver reduces mission life. Satellite operators minimize on-orbit maneuvers to maximize on-orbit mission life and so make few if any changes to the orbital plane and the orbital phase of the satellite's path.

Satellites' limited propellant load also limits orbital altitude. Depleted launch vehicles often deposit satellite payloads at altitudes well above ~350 km/217 miles, where atmospheric density is low. This low atmospheric density minimizes drag forces on the satellite, such that the satellite can maintain orbital momentum for decades, even while expending little or no propellant. The satellite in effect "coasts" around the planet in its orbital path.

A handful of small satellites have maintained Very Low Earth Orbits (VLEO) below 350 km/217 miles using a combination of (i) aerodynamic streamlining to reduce drag, and (ii) propulsion to balance the reduced drag. Propulsion using onboard reaction mass quickly expends propellant. For example, the European GOCO satellite used drag-balancing thrust to maintain orbit at ~250 km altitude, but exhausted its 40 kg of xenon propellant in under five years, ending its mission life.

There have been efforts, such as the European RAM Electric Propulsion project (see Reference 14 under Heading 4), to design and test satellite thrusters that can "scoop" air molecules into an inlet at VLEO altitudes, flow the air into a chamber, then use the air molecules as a reaction mass to balance drag by propelling the air molecules aft-ward at high speed. The amount of reaction mass is limited by the physical size of the inlet. Launch-vehicle constraints limit the weight and size of this inlet, making it expensive (often prohibitively so) for the satellite to carry a large inlet. The limited inlet size limits the amount of reaction mass that can be gathered from the rarefied atmosphere at VLEO altitudes, which limits the performance of such methods.

Embodiments of the present technology use atmospheric particles as reaction mass for sustained propulsion, without a physical inlet limiting the number of atmospheric particles.

2. Plasma Propulsion—Representative Embodiments

The assignee of the present application is also the assignee of U.S. patent application Ser. No. 16/710,393 (the "Whisper Beam" application), which is incorporated herein by reference. The Whisper Beam application describes methods for wirelessly transmitting high levels of power to high altitudes. With such transmissions, a significant amount of power is available that is not derived from on-board combustion. Accordingly, such transmissions can be used to facilitate new flight regimes, in particular, flight at altitudes substantially higher than can be achieved with existing propulsion systems. Higher altitude makes practical higher speed at lower drag.

As discussed above, FIG. 1 illustrates the approximate altitudes of atmospheric layers extending above the Earth's surface. The upper atmosphere, above ~85 kilometers, contains a natural ionization, largely from solar radiation. The ionosphere's depth changes on an hourly basis with the solar cycle and seasons. In the ionosphere itself, there is sufficient ion density for an electromagnetic engine to use the ions as an external reaction mass.

In the transitional region below ~85 km, the low-pressure atmosphere can be artificially ionized by expending some additional energy (via widely-known methods such as a microwave discharge), thereby extending plasma propulsion techniques below the ionosphere, potentially to propel a vehicle from take-off at the Earth's surface all the way up to the ionosphere. The principle can also be used in the ionospheres of planetary bodies other than Earth.

Plasma propulsion can continue to be used in the ionosphere and low Earth orbit. If an adequate power source is available, thrust can be generated in the Earth's magnetosphere (typically extending outwardly from the upper reaches of the ionosphere) by pushing against solar wind particles trapped by the Earth's magnetic field. This approach can facilitate thrusting in cislunar space, particularly in the Earth's magneto-tail. The principles would still apply beyond cislunar space, though other propulsion systems may be more practical.

Accordingly, the term "plasma propulsion" as used herein can apply to techniques used in any environment in which a plasma surrounds the vehicle. This plasma can be weakly-ionized or strongly-ionized, can be naturally occurring or artificially created, and can be below, in, and/or above the Earth's ionosphere (e.g., at lower and/or higher altitudes). By using enhanced ion-generation (e.g., generating a local ionized region), embodiments of the present technology can power a vehicle from the Earth's surface all the way to outer space.

FIG. 2 is a table briefly outlining the relative populations of ions and neutral particles in the atmospheric layers described above with reference to FIG. 1. As illustrated in FIG. 2, representative vehicles in accordance with the present technology can operate in any of these layers, with the operational mode potentially differing from one layer to another.

A. Cyclically Energized Coil Embodiments

Embodiments of the present technology extend a dipole magnetic field into a surrounding plasma, then translate (move) that magnetic field, pushing ions in the plasma to form a magneto-hydrodynamic (MHD) flow of atmospheric particles.

As is well known to those skilled in the art, magnetic fields are linear systems created from the influence of multiple currents. Because they are linear, they obey the principle of superposition. The various currents can be added in any way convenient to a superposition of the magnetic fields formed by the various current elements. Often, those skilled in the art will refer to movement of a magnetic field as a shorthand phrase for movement of the superposition of multiple individual magnetic fields, referring to the field as having a location and strength even though generated from coils that are separated in time or space to generate multiple magnetic fields with a single superposition.

Figure 4B:
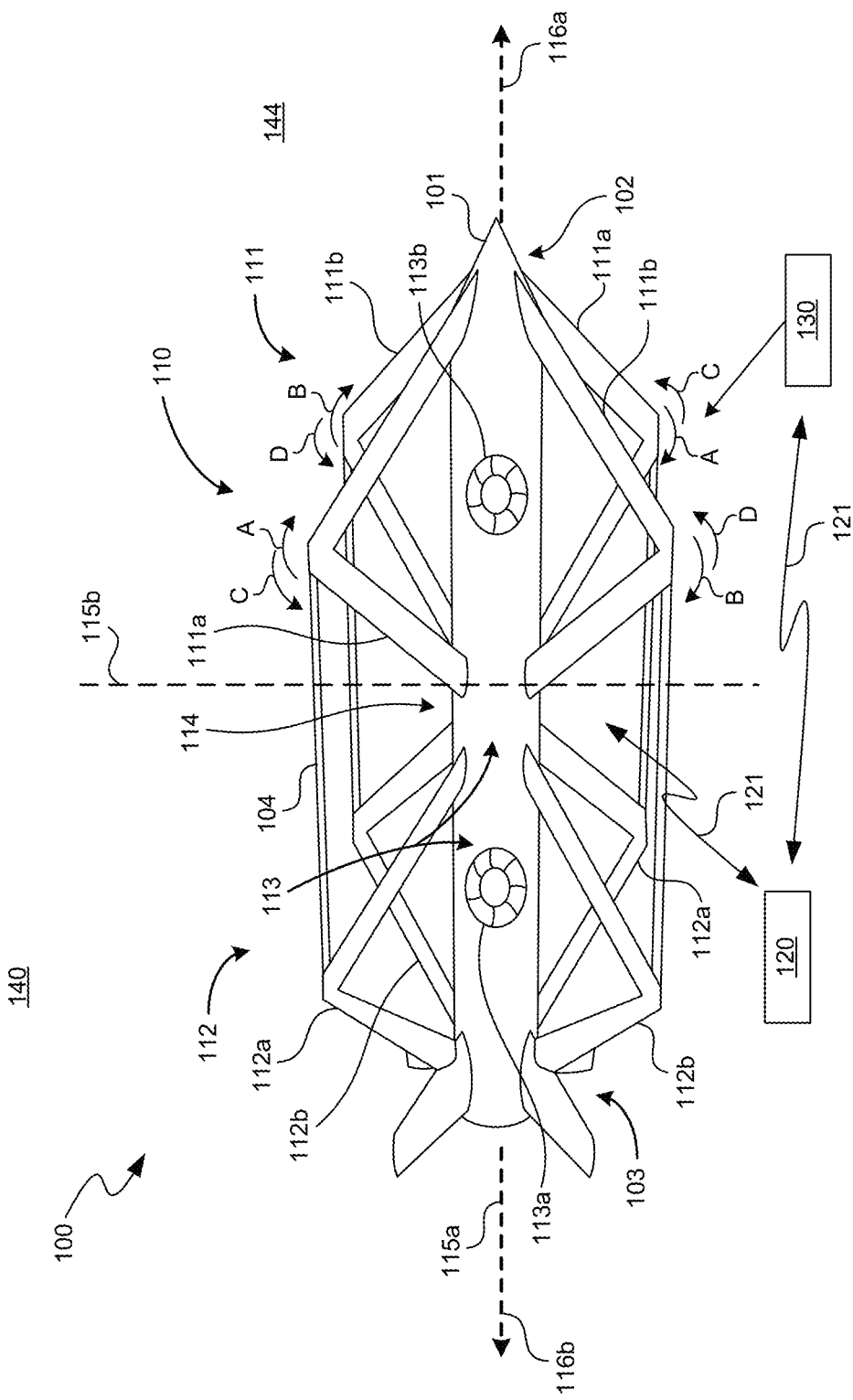
FIG. 4B is a partially schematic illustration of a representative flight vehicle configured to generate rotating magnetic fields in accordance with embodiments of the present technology.
Figure 11A:
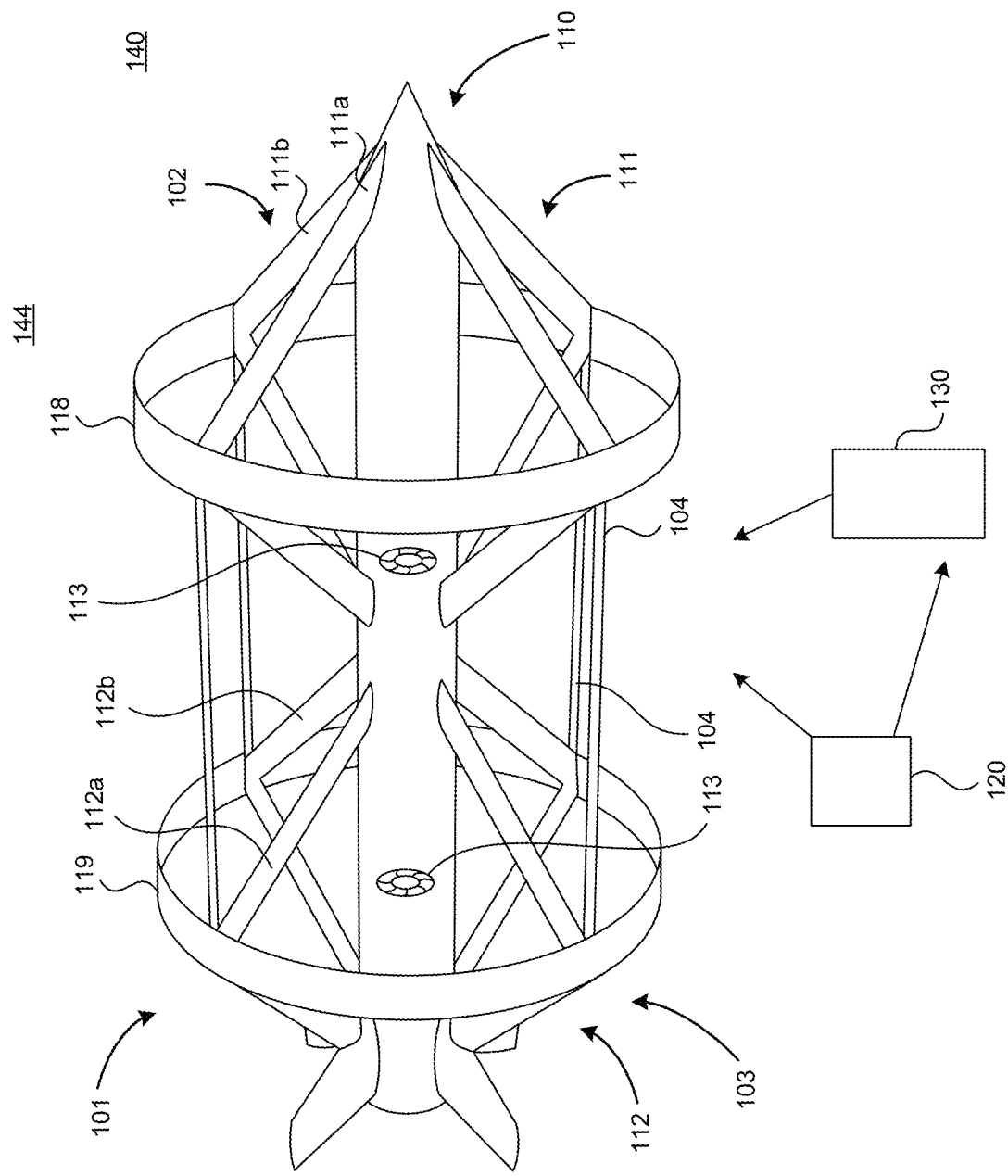
FIGS. 11A and 11B are a partially schematic, isometric illustration of a vehicle having additional, circumferential, coils in accordance with embodiments of the present technology.
Figure 11B:
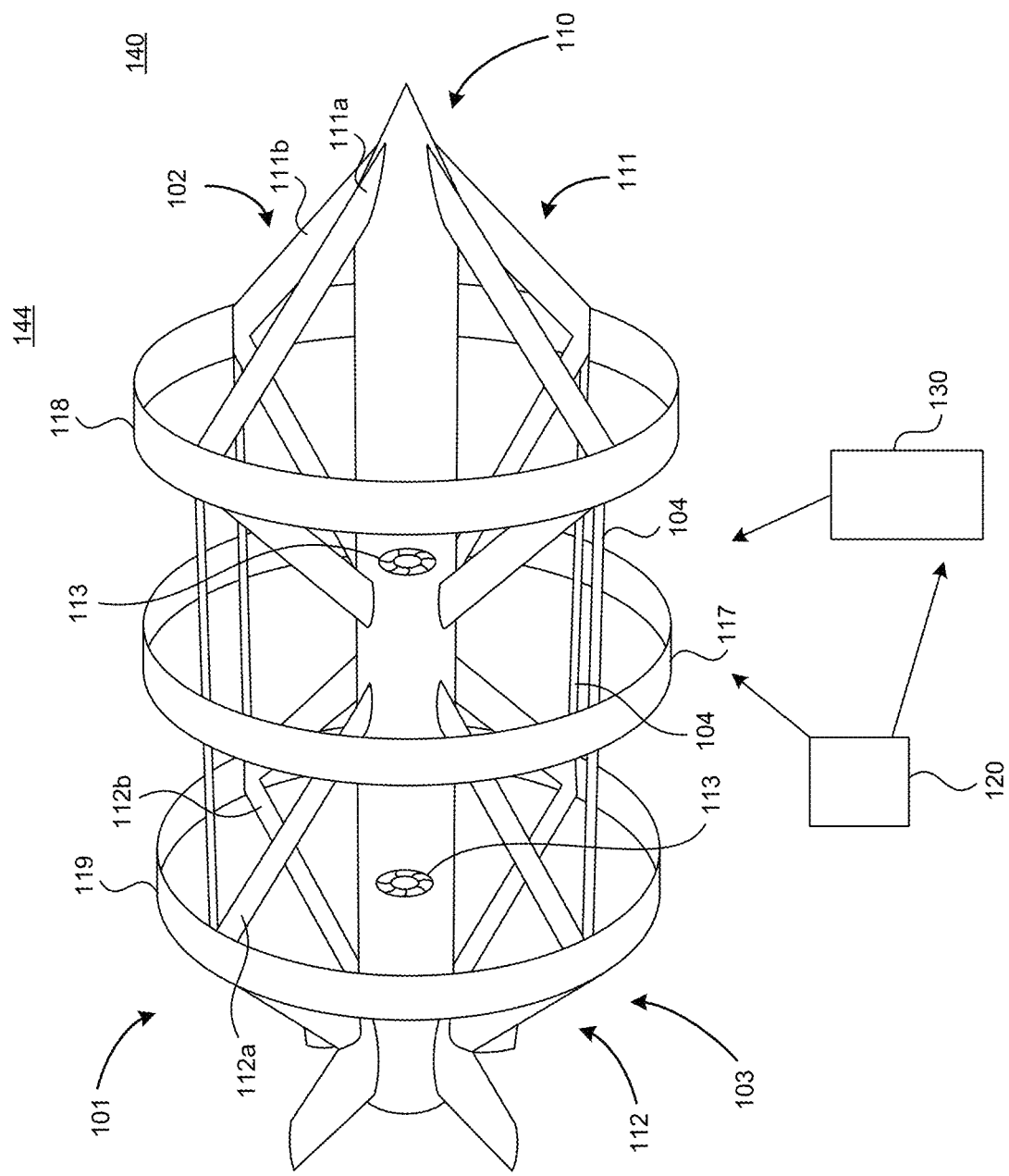

Embodiments of the present technology include two (or more) drive coils to translate the superposition of a dipole magnetic field. In one embodiment, each drive coil is a single coil, such as illustrated in FIG. 4A. To enhance efficiency and thrust, in another embodiment each drive coil can be configured as a set of two (or more) orthogonal coils (e.g., orthogonal to a vehicle thrust axis 115a), such as is shown in FIG. 4B. To further enhance thrust and efficiency, in another embodiment one or more circumferential coils can be added to each orthogonal drive coil set, such as shown in FIG. 11A. In another embodiment, an additional coil can be added to enhance ionization, such as is shown in FIG. 11B, Each of these embodiments is discussed in more detail further below.

In operation, the first drive coil (or coil set) 111 can be used to generate an external dipole magnetic field, then a second drive coil (or coil set) 112 can be used to translate the superposition of the external dipole magnetic field. As the superposition translates, it pushes ions in the surrounding plasma. Energy is then (optionally) stored in one or more storage coil(s) 113 to reduce or eliminate the dipole magnetic field from the plasma. The cycle can then be repeated by again generating a dipole magnetic field from the first drive coil (or coil sets) 111. This approach can be used to accelerate particles (e.g., treat a substrate in a deposition or ion implantation process) or, if the system is installed on a flight vehicle, to accelerate the vehicle. The terms "flight vehicle" and "vehicle" are used to refer to vehicles configured to operate within a neutral atmosphere such as Earth's atmosphere below the ionosphere, and/or in a weakly-ionized plasma such as Earth's ionosphere, and/or in a near-vacuum strongly-ionized plasma, such as outer space.

By analogy, embodiments of the present technology act as a sort of 'magnetic propeller' in any suitable ionized region. The translating magnetic field thrusts ions external to the vehicle, creating a thrust of ion particles in the surrounding plasma.

FIG. 4A is a partially schematic, isometric illustration of a system 100 that includes a flight vehicle 101. The force produced by the coils (or coil sets) operates along a force axis 115. Depending upon the order in which the coils (or coil sets) are energized and de-energized, the force can operate along the force axis in a first direction 116a, or a second direction 116b. To decelerate the flight vehicle 101 (or drive the flight vehicle 101 in the opposite direction 116b), the order in which the first and second coils 111, 112 are energized and deenergized is reversed. In a particular embodiment, additional coils can be employed along a transverse or lift axis 115b to apply forces on the flight vehicle 101 that are transverse to the thrust axis 115a. If such coils are included, the forces applied by such coils can be generated sequentially relative to the forces supplied by the illustrated coils 111, 112. Alternatively, the forces applied by coils oriented along the thrust axis 115a and the lift axis 115b can be applied simultaneously, provided the resulting magnetic fields do not unduly interfere with each other.

The first and second coils 111, 112 can be supported relative to the flight vehicle 101 via supports or braces 104. The illustrated flight vehicle 101 can have a generally "rocket-shaped" configuration in some embodiments. Similarly, the illustrated flight vehicle 101 can include fins 105, as in a conventional rocket. The cylindrical shape can be used to house conventional combustion fuels for low altitude operation, e.g., if the flight vehicle has a "hybrid" electric/combustion configuration. The fins may be used to guide the flight vehicle 101 in high dynamic pressure environments. In other embodiments, the shape of the flight vehicle 101 can be significantly different, and the flight vehicle 101 need not include fins 105, for example, if the flight vehicle is operated only at altitudes having a very low dynamic pressure and/or can rely on the forces generated by the coils 111, 112 to avoid the need for carrying any combustible fuels.

B. Storage Coil(s)

As noted above, the system 100 includes one or more storage facilities (e.g., storage coil(s) 113), to store magnetic energy while generating little or no external magnetic field. In one embodiment, the storage facility can be a toroidal coil. A toroidal coil has a magnetic field internal to the coil when energized, but it is a closed magnetic volume with little or no external magnetic field. This storage coil 113 still has inductance, and stores the current and energy, but the external magnetic field area is zero (or at least lower than the external fields of the first and second drive coil (or coil sets) 111, 112). Accordingly, because the storage coil(s) 113 generate little or no external magnetic field, they do not interfere with the fields generated by the first and second drive coils (or coil sets) 111, 112. Instead, the storage coil(s) 113 can be used to transfer power between the first and second drive coils (or coil sets) 111, 112. For example, when the vehicle 101 is moving in the forward direction 116a, the storage coil(s) 113 can store energy from the second coil (or coil set) 112, and return that energy to the first coil (or coil set) 111 prior to initiating the next cycle. If the vehicle 101 is to decelerate, or move in the aft direction 116b, the storage coil 113 can store energy from the first coil (or coil set) 111 in a reverse sequence.

The first and second drive coils (or coil sets) 111, 112 can have any of a number of suitable shapes and/or configurations. For example, as shown in FIG. 4A, the coils can have the form of a large circular loop, e.g., one wire describing a circle with a large effective radius or other characteristic dimension. As shown in FIG. 4B, the coils can have a generally rectangular or diamond shape. In other embodiments, the coils can have an elliptical or other suitable shape.

In at least some embodiments, a generally rectilinear shape, as shown in FIG. 4B, may be simpler to manufacture and/or may provide better structural support for other devices when implemented on the flight vehicle. In another embodiment as shown in FIG. 11A, a coil set can be composed of one or more generally circular coil(s) and one or more generally rectangular coil(s).

C. Coil Gap

Each drive coil (e.g., the first drive coil(s) 111) can be separated from each other drive coil (such as 112) by a coil gap 114. The coil gap 114 generally corresponds to the minimum distance between the coils. The coil gap 114 can be selected to suit a particular application, such as to provide a longer stroke length of the translating dipole magnetic field to move external ions a longer distance to optimize thrust levels. In other embodiments, the coil gap 114 can be varied, or multiple coil sets can be used or temporarily not used to vary the coil gap. In one embodiment, the coil gap 114 may be less than the length of a single magnetic coil or even of negligible length compared to the length of a single magnetic coil (or coil set). In another embodiment, the coil gap 114 may be many multiples of the length of a single magnetic coil. If more than two drive coils are used, the coil gap 114 between one pair of drive coils can be the same or different from the coil gap 114 between a different pair of drive coils. In any of these embodiments, the flight vehicle 101 can further include one or more braces or supports 104 to add structure to the coils 110, again, in a manner that prevents or reduces interference between the coils.

As shown schematically in FIG. 3A, representative system 100 in accordance with one embodiment includes multiple coils 110, e.g., a first drive coil (or coil set) 111, a second drive coil (or coil set) 112, and one or more storage coil(s) 113 coupled with corresponding capacitors 132a, 132b, 132c in a circuit 119. One or more power source(s) 130 provide/transfer power to the coils 110 at a level and in accordance with a timing pattern that is controlled by a controller 120. Accordingly, the controller 120 is operatively coupled to the coils 110 and/or the power source(s) 130 via one or more communication links 121 (e.g., a wired or wireless link). The controller 120 is configured to direct and/or control operations of the system and can do so via analog inputs and links and/or digitally via logic circuits.

D. Power Sources

In an embodiment illustrated in FIG. 3A, the system 100 can include either or both of two power sources 130, illustrated as first power source 130a and a second power source 130b. The first power source 130a is directly coupled to the circuit 119. The second power source 130b can transfer power to control the first drive coil (or coil set) 111 or the second drive coil (or coil set) 112 via a transformer coil 133. In any of these embodiments, the circuit 119 further includes components, devices and/or other arrangements or means to transferring power between coils (or coil sets), such as wireless inductive transmission or wired transmission lines 131 to convey current throughout the circuit. The controller 120 (either analog or digital) can control the amplitude of the resulting magnetic field by controlling the power provided to the circuit via the power source(s) 130, and can control the frequency of the magnetic field by controlling the capacitance of the capacitors 132a-132c. Depending on the embodiment, the controller 120 can also control other features of the system 100, and/or features of other components to which the system is coupled.

E. Representative Methods

Figure 3B:
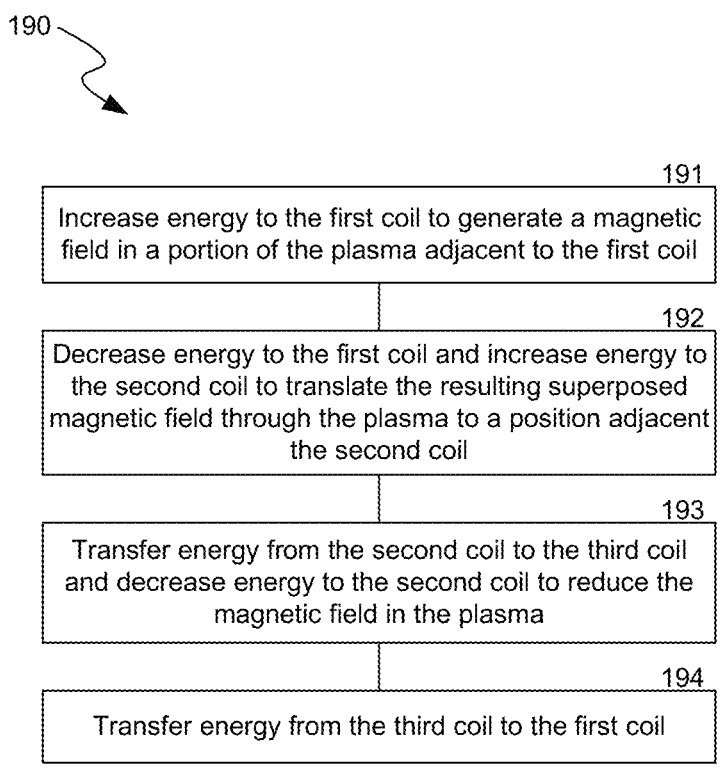
FIG. 3B illustrates a representative overall process for generating a force using multiple coils to generate corresponding magnetic fields, in accordance with embodiments of the present technology.

FIG. 3B is a flowchart illustrating a representative process 190 for generating the forces described above with reference to FIG. 3A. The process 190 includes increasing energy to the first drive coil (or coil set) to generate a magnetic field (block 191). In block 192, the process includes decreasing energy to the first drive coil (or coil set), and increasing energy to the second drive coil (or coil set) to translate the resulting superposed magnetic field through a plasma to a position adjacent the second drive coil (or coil set). At this point, the second drive coil (or coil set) receives more energy than the first drive coil (or coil set). The process of decreasing energy to the first drive coil (or coil set) can be performed simultaneously with increasing energy to the second drive coil (or coil set), or these processes can be performed sequentially. In a particular embodiment, for example, if the first and second drive coils (or coil sets) include superconducting materials, the energy carried by the first drive coil (or coil set) can be transferred to the second drive coil (or coil set), to both decrease the energy of the first drive coil (or coil set), and increase the energy of the second drive coil (or coil set). The process of transferring the energy and generating the associated fields on the surrounding environment produces a force. If the process were to simply cycle the energy back and forth between the first drive coil (or coil set) and the second drive coil (or coil set), each force would be countered by the next. Instead, as indicated in block 193, the energy can be transferred from the second coil (or coil set) to a storage coil or other device for reducing or collapsing the magnetic field. The storage coil can be magnetically isolated, so as not to produce the negating effect. The energy transferred to the storage coil is then transferred to the first drive coil or coil set (block 194). The foregoing cycle can then be repeated to generate an additional force. As described later, the storage coil can be eliminated in some embodiments.

F. Simple Coil Configurations

Returning to FIG. 4A, the flight vehicle 101 travels through an external environment 140 that includes (or can be made to include) a plasma 144. The flight vehicle 101 includes a forward portion 102 and an aft portion 103, arranged along a thrust axis 115a. Forces applied to the flight vehicle 101 can propel it in a forward direction 116a, an aft direction 116b and/or transverse directions. A power source 130 provides power to multiple coils 110, and a controller 120 directs the operation of the coils in a manner generally similar to that described above with reference to FIGS. 3A and 3B. Accordingly, the first drive coil 110 can be energized (e.g., energy applied to the first drive coil can be increased) to generate a magnetic field in a portion of the surrounding plasma 144 adjacent to the first drive coil 110 and the forward portion 102 of the flight vehicle 111. The energy applied to the first drive coil is then decreased, and the energy applied to the second drive coil 112 is increased to translate the resulting superposed magnetic field through the plasma 144 to a position adjacent to the second drive coil 112. The effect is to move particles within the plasma 144 (e.g., ions and/or particles impinged upon by the ions) toward the aft portion 103 of the flight vehicle 101. The particles accordingly act as a reaction mass, forcing the flight vehicle 101 forward, as indicated by arrow 116a.

After one such cycle, power can be transferred from the second drive coil 112 to a storage coil 113. Energy in the storage coil 113 can then be used to supply energy to the first drive coil 111, thus repeating the cycle to again sweep the external magnetic field in one direction through the plasma to apply force to the flight vehicle 101.

G. Coil Configurations Producing External Current Ring

Several publications by Slough (see References 5-9 under Heading 4) disclose that energized coils can create a rotating magnetic field in a plasma. When the rotating magnetic field frequency is less than or equal to the electron gyro frequency of the plasma, the rotating magnetic field can drag the electrons in the plasma and thereby induce a circulating electron current in the plasma, forming a current ring around the vehicle. In general, the radius of the current ring is larger than the radius of the energizing coils.

The current ring in turn generates a dipole magnetic field that interacts with ions in the plasma. In outer space and other environments with very tenuous plasmas, this principle can be used to make a sail, with the solar-wind plasma pushing on the sail. (See, e.g., the Slough Plasma Magnet References 5-9 under Heading 4).

A publication by the present inventor titled "A Reaction Drive Powered By External Dynamic Pressure," incorporated herein by reference (Reference 4 under Heading 4, hereinafter the "Greason Reference") discloses a plasma device for extracting power from the solar wind. The vehicle establishes a translating magnetic field (a field that is moving with respect to the vehicle). The solar wind does work on the translating magnetic field and allows power to be transferred from the motion of the solar wind to the vehicle for purposes of extracting electrical energy. The extracted electrical energy can then be used to power a propulsion system such as an electric Hall effect thruster using xenon propellant or other means of accelerating a reaction mass carried on board the vehicle, or as a supply of power for other purposes on-board.

In accordance with embodiments of the present technology, the vehicle provides electrical power, whether that power is generated on-board or transmitted to the vehicle from an external source. That electrical power pushes a translating magnetic field against the surrounding plasma, thus using the surrounding plasma as a reaction mass.

A weakly-ionized plasma contains a substantial number of neutral particles. For example, the Earth's ionosphere has a substantial number of neutral particles, and an artificially-ionized region in the lower atmosphere typically has a large number of neutral particles. Moving ions collide with the neutral particles. A charge exchange often occurs when ions collide with neutral particles, in which the ion is neutralized and the neutral particle is ionized. The newly ionized particles then collide with other neutral particles, in a cascade charge exchange. This principle is applied in Slough's plasma magneto-shell (Reference 11 identified under Heading 4), to enhance drag on a magnetic field being pulled through a plasma acting as an aero-brake. The present technology uses multiple drive coils (or coil sets) to generate a dynamic magnetic field that translates along the vehicle. This translating magnetic field pushes the atmospheric ions, which provide both reaction mass and a charge exchange when colliding with neutral particles. The combination provides a reaction force that is transmitted back to push the vehicle. A substantial portion of the total thrust results from the cascade charge exchange with neutral particles.

As explained above, this approach can be used to generate thrust in any direction. Axial forward thrust can propel the vehicle through the atmosphere. Axial reverse thrust can slow the vehicle, such as during reentry from space into the atmosphere, or even move the vehicle in the opposite direction. While the prior art teaches deploying a static magnetic field acting as a "sail" to create drag forces while a vehicle passes through an ionosphere, the presently disclosed plasma propulsion techniques can provide a dynamic reverse thrust to slow the vehicle more quickly. During reentry into the atmosphere, the vehicle can use the drive coils (or coil sets) to gather energy from the wind moving past the vehicle, and use that energy to generate a reverse thrust to slow the vehicle.

H. Lift/Drag (L/D) Enhancement

Downward thrust can provide lift, enabling the vehicle to hover in place at high altitude. The thrust vectors (e.g., lift and axial thrust) can be combined for cruise. In one embodiment, all thrust and lift is provided by the cyclically operated drive coils (or coil sets). In another embodiment, the lift from suitably oriented drive coils (or coil sets) can supplement lift from aerodynamic surfaces such as wings or to cruise at low speed at which aerodynamic surfaces are ineffective.

One representative application of the cyclically operated coils is to enhance a flight vehicle's lift-over-drag (L/D) ratio. L/D is a key performance metric for atmospheric flight vehicles. L/D is proportional to the ratio of: (i) the speed of forward flight, to (ii) the speed of transverse air flow, such as downwash flow from a wing providing lift. The higher the L/D, the better the vehicle performs. For example, an aircraft with a higher L/D requires less fuel to remain aloft. For conventional supersonic and hypersonic aircraft using aerodynamic lifting surfaces, L/D drops rapidly in the transition from subsonic to supersonic flight and tends to drop further at higher Mach numbers. This has been a challenge for supersonic and hypersonic vehicle designers for the last several decades.

As described above, embodiments of the present technology can be used to generate thrust in a longitudinal direction (e.g., the flight direction), and/or in a direction lateral to the direction of flight, such as to create lift for the vehicle. This approach produces L/D ratios far higher than has previously been thought possible for supersonic and hypersonic aircraft. In one embodiment, a vehicle can be propelled to high speed by any method (such as a solid or liquid-fueled rocket), then glide using a conventional wing through the ionosphere. The vehicle can use Plasma Piston to enhance lift, thereby increasing its L/D ratio, thereby substantially extending vehicle range.

Slough (see Reference 11 under Heading 4) teaches a method for generating a dipole magnetic field by confining electrons in the plasma into a rotating magnetic field which in turn forms the larger dipole magnetic field.

One embodiment of the present technology generates thrust by translating the superposition of rotating magnetic fields, to translate the superposition of the resulting dipole magnetic fields, to push on ions in the plasma. Representative embodiments are described below with reference to FIGS. 4B-12.

FIG. 4B is a partially schematic illustration of a system 100 that includes a flight vehicle 101. As discussed above with reference to FIG. 4A, the flight vehicle 101 includes a forward portion 102 and an aft portion 103, arranged along a thrust axis 115a. Forces applied to the flight vehicle 101 can act in a forward direction 116a, or an aft direction 116b. One or more power sources 130 provide power to one or more coils 110, and a controller 120 directs the operation of the coils in a manner generally similar to that described above. Accordingly, the controller can include one or more processors and one or more memories (e.g., computer-readable media) for carrying out the processes described herein, or the controller can operate in an analog manner.

A rotating magnetic field can be formed using various methods well known to those skilled in the art. A common method is a coil set configured orthogonally, with one coil (such as 111a in FIG. 4B) placed 90 degrees from the other coil (such as 111b in FIG. 4B). If more than two coils are used in a coil set, the coils can be configured at different intervals, such as three coils each spaced 60 degrees apart. In other embodiments more coils may be used.

In an embodiment shown in FIG. 4B, the coils 110 include a first drive coil set 111, composed of two or more coils, positioned toward the forward portion 102 of the vehicle 101, and a second drive coil set 112, also composed of two or more coils, positioned toward the aft portion 103. As shown in FIG. 4B, the flight vehicle 101 includes two coils in the first coil set 111, shown as a "position A" first coil 111a and a "position B" first coil 111b. The flight vehicle 101 also includes two coils in the second coil set 112, shown as a "position A" second coil 112a, and a "position B" second coil 112b. The position B coils can be "clocked" or oriented at an angle about the thrust axis 115a relative to the position A coils. In at least some embodiments, the clocking angle is 90°, but can have other values in other embodiments. The multiple first coils and multiple second coils are sometimes referred to herein as coil sets.

A representative arrangement includes:
A first coil set having two drive coils 111a, 111b, oriented approximately 90 degrees relative to each other.
A second drive coil set also having two coils (e.g., the first and second coils 112a, 112b) oriented at approximately a 90 degree angle relative to each other.
Two storage coils 113a, 113b that are magnetically shielded from the external fluid (e.g., toroidal coils) provide energy storage.
A representative operational sequence is provided below. The first drive coil set 111 flows current in quadrature to generate a rotating magnetic fields as follows:
A current is flowed in a clockwise direction in the position A first drive coil 111a, as indicated by arrows A, creating an external magnetic field outward from the coil. If envisioned by the right hand rule, the right hand fingers would curl clockwise and the right thumb point into the plane (into the page) of FIG. 4B.
The position A first drive coil 111a is de-energized, for example, at the same time the position B first drive coil 111b is energized, with a clockwise flowing current, as indicated by arrows B, causing the external magnetic field to sweep 90 degrees around the thrust axis 115a.
The position B first coil 111b is de-energized at the same time that the position A first coil 111a is re-energized—but with counterclockwise current, as indicated by arrows C—causing the external magnetic field to sweep a further 90 degrees around the thrust axis 115a of the vehicle 101. The external magnetic field has now swept 180 degrees since the start of this cycle.
The position A first coil 111a is de-energized at the same time the position B first coil 111b is energized with current in the counterclockwise direction, as indicated by arrows D, causing the external magnetic field to sweep a further 90 degrees around the thrust axis 115a (the external magnetic field having swept 270 degrees since the start of this cycle).

Then, the position B first coil 111b is de-energized at the same time the position A first coil 111a is re-energized with clockwise current, as indicated by arrows A, causing the external magnetic field to sweep a further 90 degrees around the thrust axis 115a, with the external magnetic field having swept through 360 degrees since the start of this cycle.

The energizing and de-energizing process is typically continuous in operation, so that the external magnetic field is continuously sweeping around the vehicle (e.g., around the longitudinal axis 115a of the vehicle).

Figure 5:
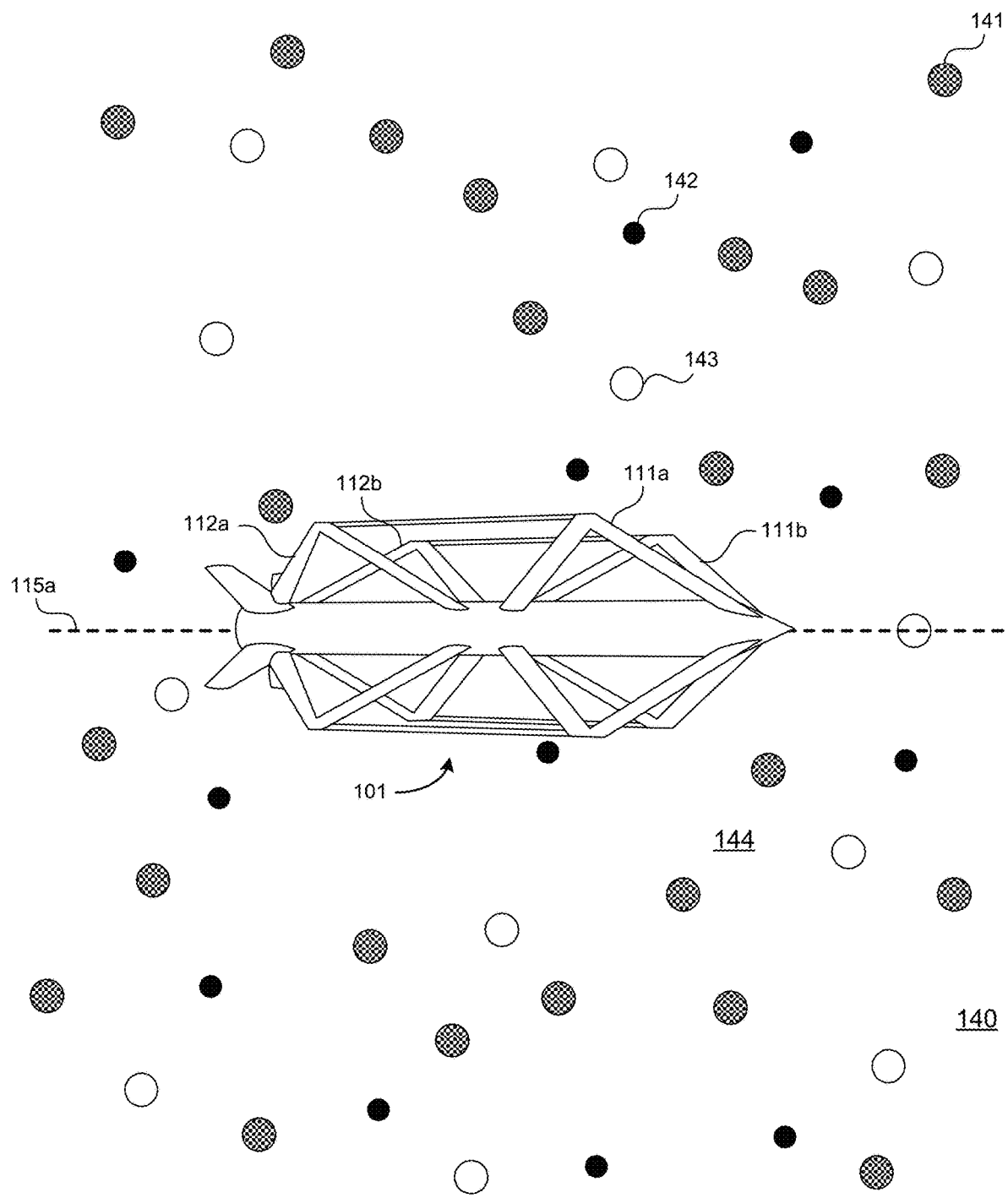
FIG. 5 illustrates a representative flight vehicle surrounded by a fluid that includes positively charged particles, negatively charged particles, and neutral particles.

FIG. 5 illustrates the flight vehicle 101 in an external environment 140 that includes a plasma 144. The illustrated plasma 144 is weakly-ionized, and includes ions 141, electrons 142 and neutral particles 143 (all shown schematically). In other embodiments, the plasma 144 can be strongly ionized.

Figure 6:
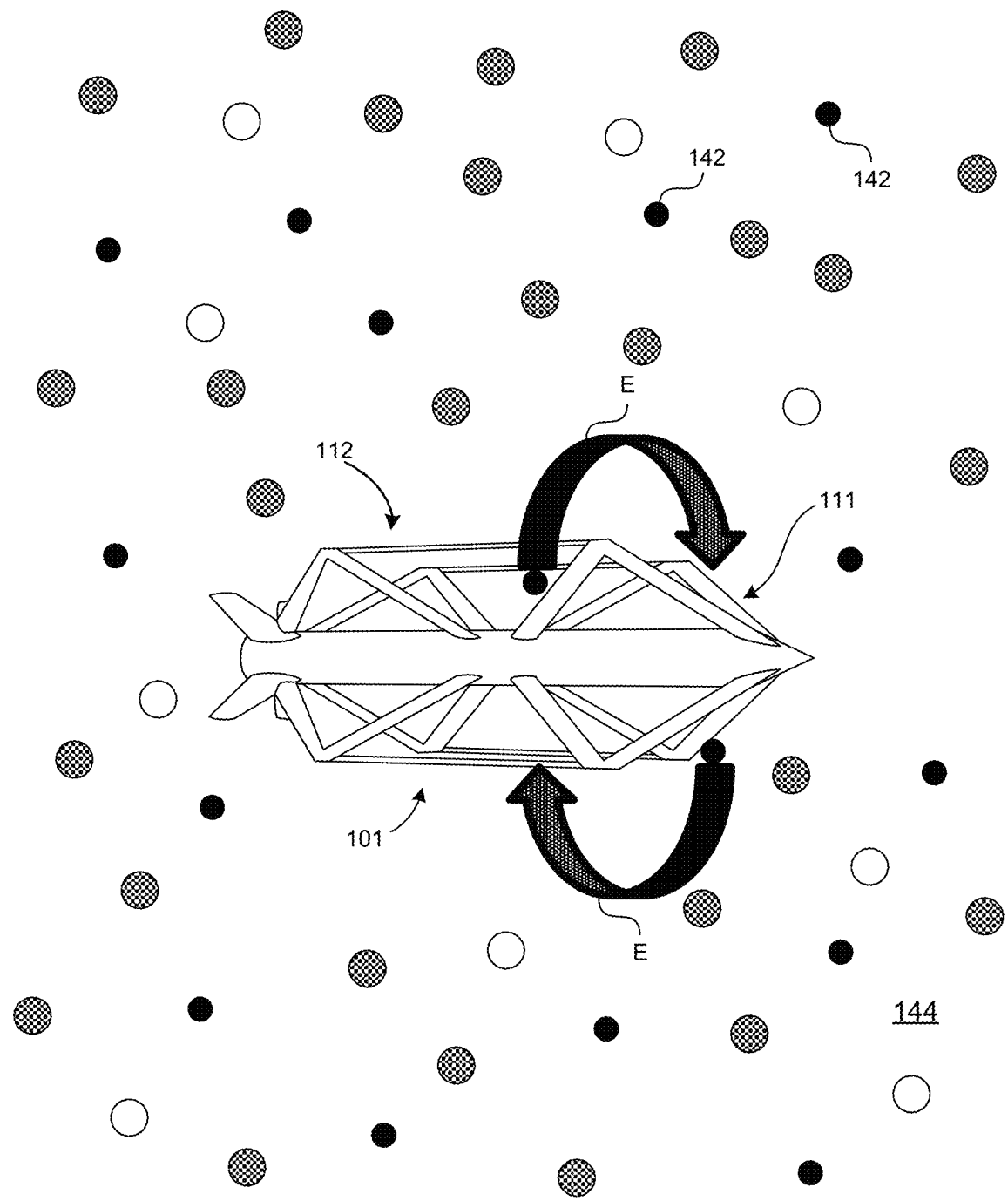
FIG. 6 schematically illustrates a representative flight vehicle having two coil sets (each set composed of two coils) generating a rotating magnetic field (RMF) that gathers electrons from the surrounding fluid, in accordance with embodiments of the present technology.
Figure 7:
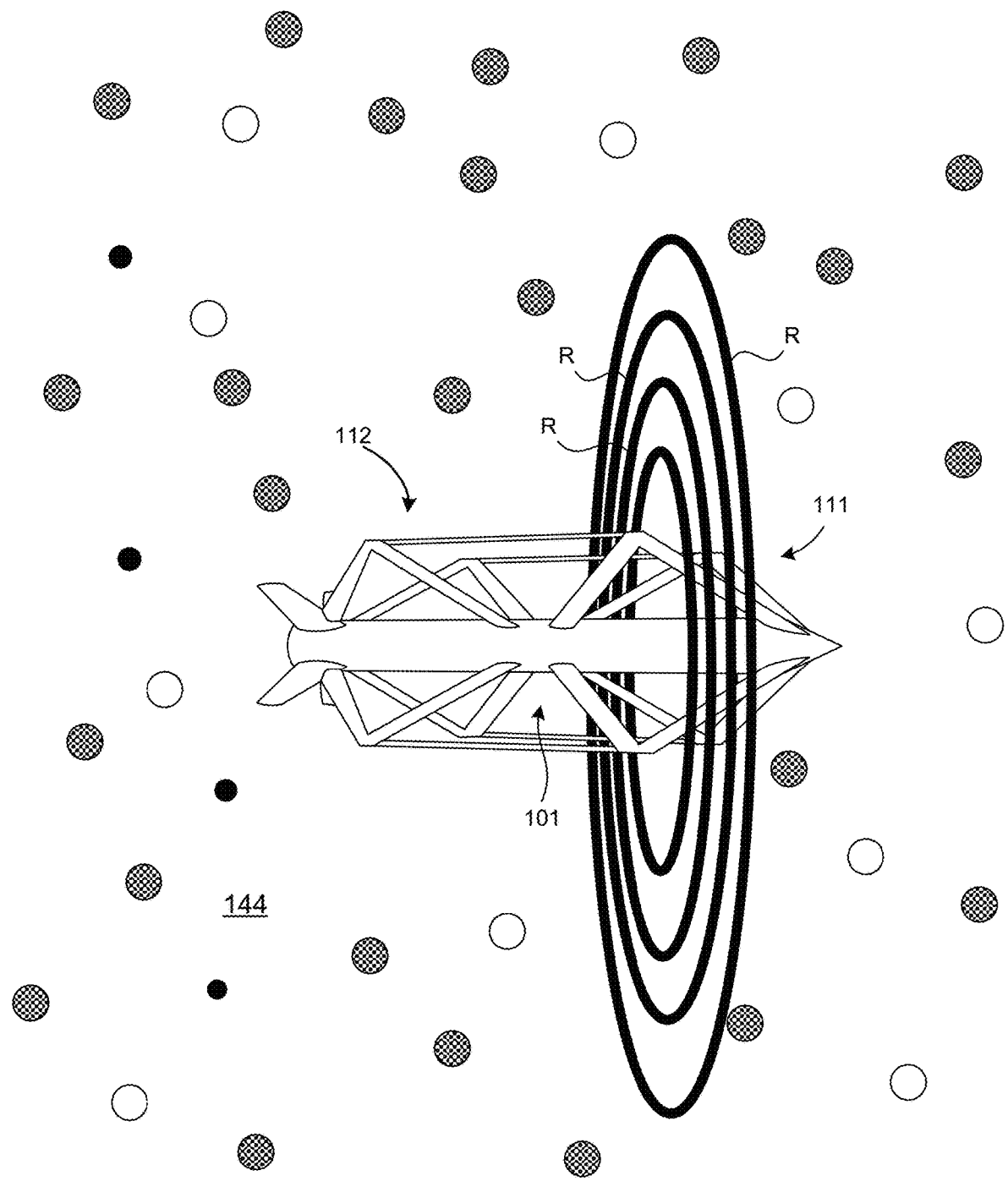
FIG. 7 schematically illustrates electrons from a fluid surrounding a flight vehicle forming one or more current rings around a coil set, in accordance with embodiments of the present technology.
Figure 8:
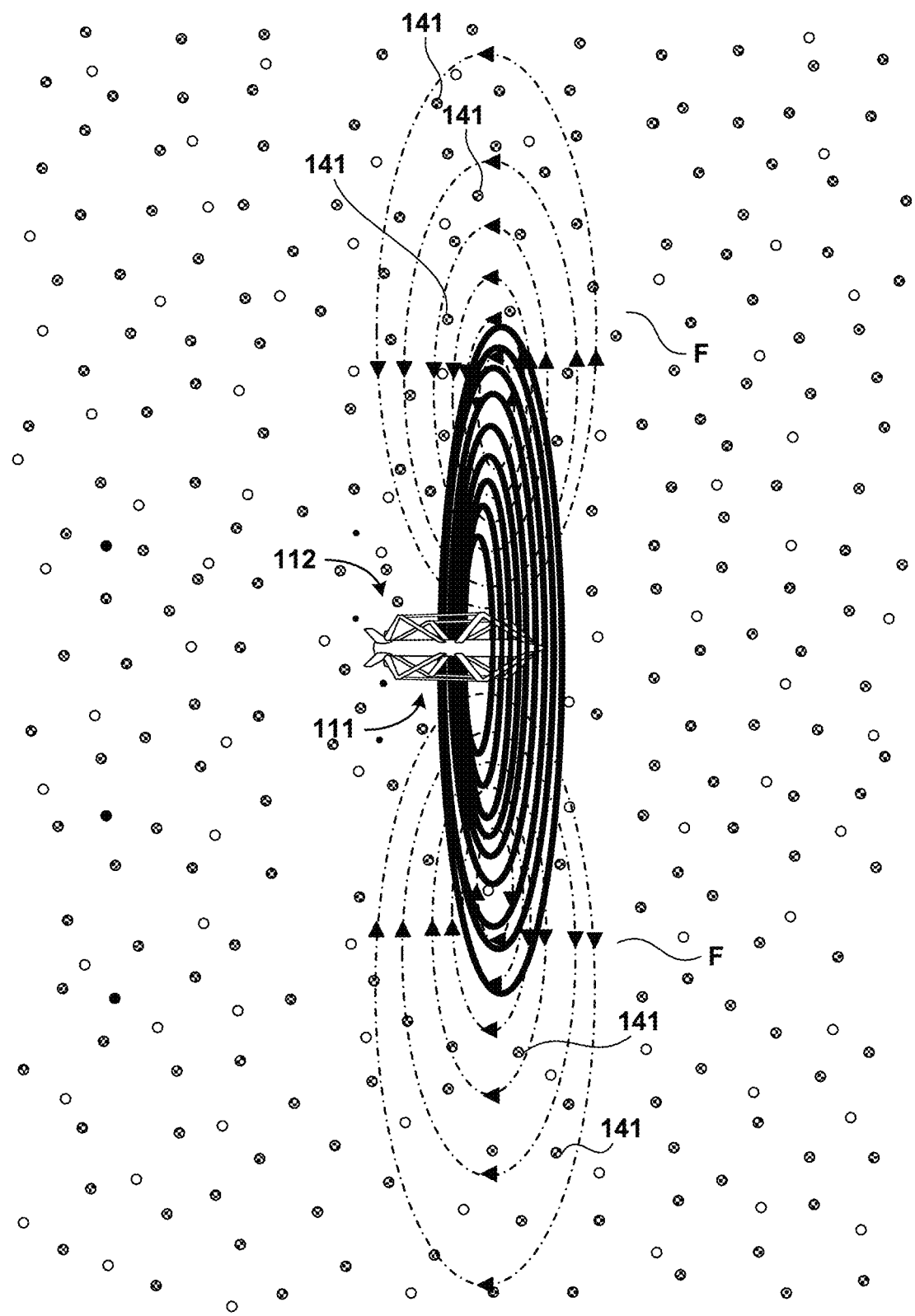
FIG. 8 illustrates the one or more current rings generating a wider dipole magnetic field extending into the surrounding fluid, in accordance with embodiments of the present technology. In this illustration the current ring is depicted with a three-dimensional perspective, and for the viewer's benefit the dipole magnetic field is depicted with a two-dimensional perspective.

FIG. 6 illustrates the effect of the current flows through the first coil set 111. The rotating magnetic field (RMF) created by the current flows described above with reference to FIG. 4B drags external electrons 142 with it, as illustrated in FIG. 6 by arrows E, but is too fast to drag the external ions 141 along. The continuous flow E of external electrons 142 creates one or more rings R of current in the external plasma 144, circulating around the vehicle 101, as illustrated in FIG. 7.

The external current ring(s) R generate an external dipole magnetic field F (as illustrated in two dimensions in FIG. 8), sometimes referred to as a plasma magnet.

Figure 9:
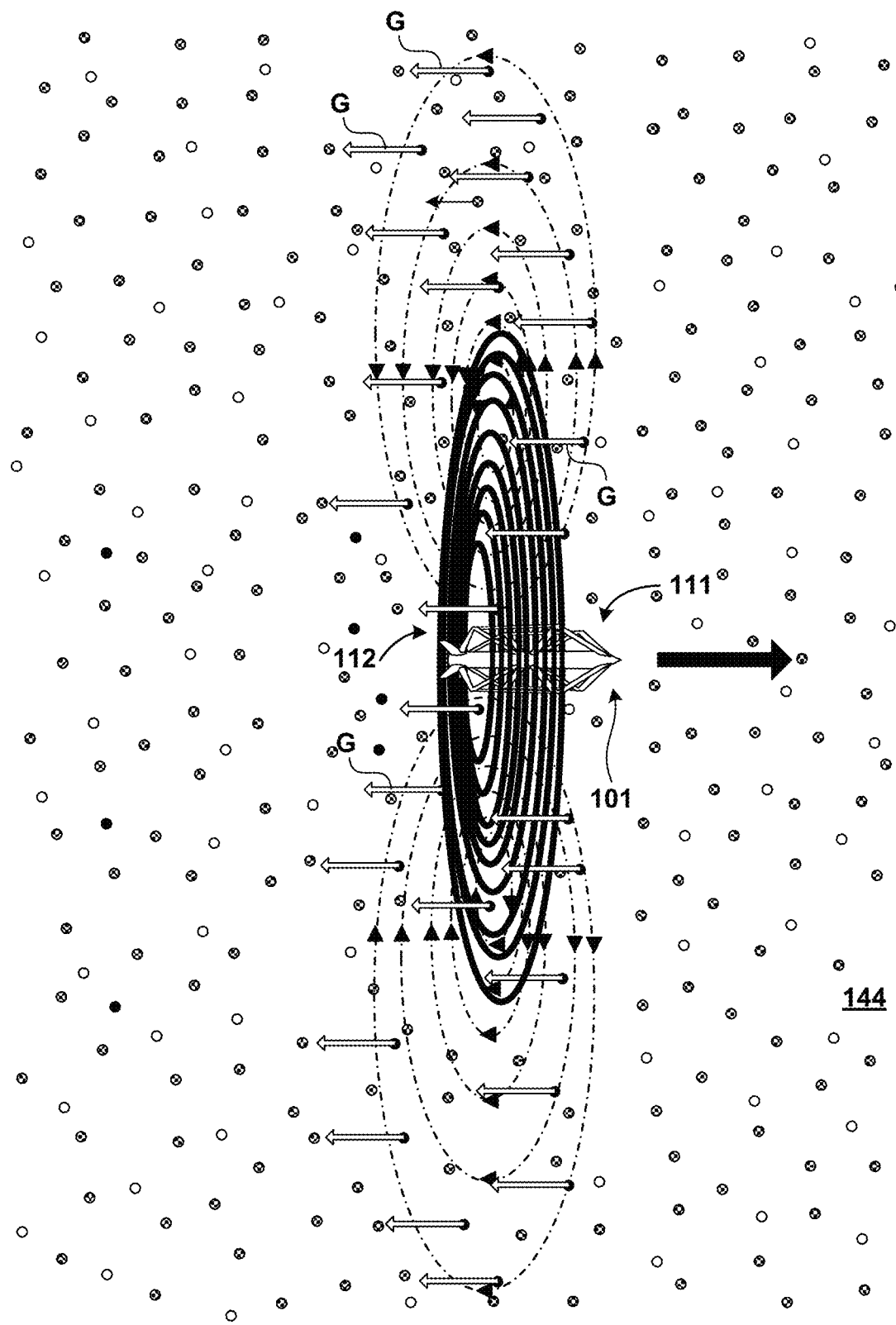
FIG. 9 illustrates the RMF and dipole magnetic field being shifted aft, by transferring electrical power from a forward coil set to an aft coil set, pushing ions in the surrounding plasma in accordance with embodiments of the present technology.

De-energizing the first drive coils 111a, 111b and energizing the second drive coils 112a, 112b causes the superposition of the rotating magnetic field (RMF) to shift in an aft direction from the first drive coil set 111 to the second drive coil set 112. This shift in the RMF causes the superposition of the dipole magnetic field F to translate toward the second drive coil set, as illustrated in FIG. 9. The translating dipole magnetic field F pushes ions in the external fluid, sweeping those ions in the general direction of the second drive coil set 112 as indicated by arrows G.

The second drive coil set 112 is then de-energized, and the energy moved into the storage coil (not visible in FIG. 9, and shown as 113a and 113b in FIG. 4B), reducing or collapsing the rotating magnetic field and its dipole magnetic field. The first drive coil set 111 is then energized to create a rotating magnetic field as described above, and the cycle begins again, first by creating an RMF around the first drive coil set 111, then translating the RMF to the second drive coil set 112, then energizing the storage coil 113a, 113b. Each sweep of the moving dipole magnetic field pushes external ions 141 as reaction mass.

As shown in FIGS. 4B-9, the propelled fluid can act as reaction mass moving aft-ward, creating a small thrust pushing a vehicle 101 forward.

Figure 10:
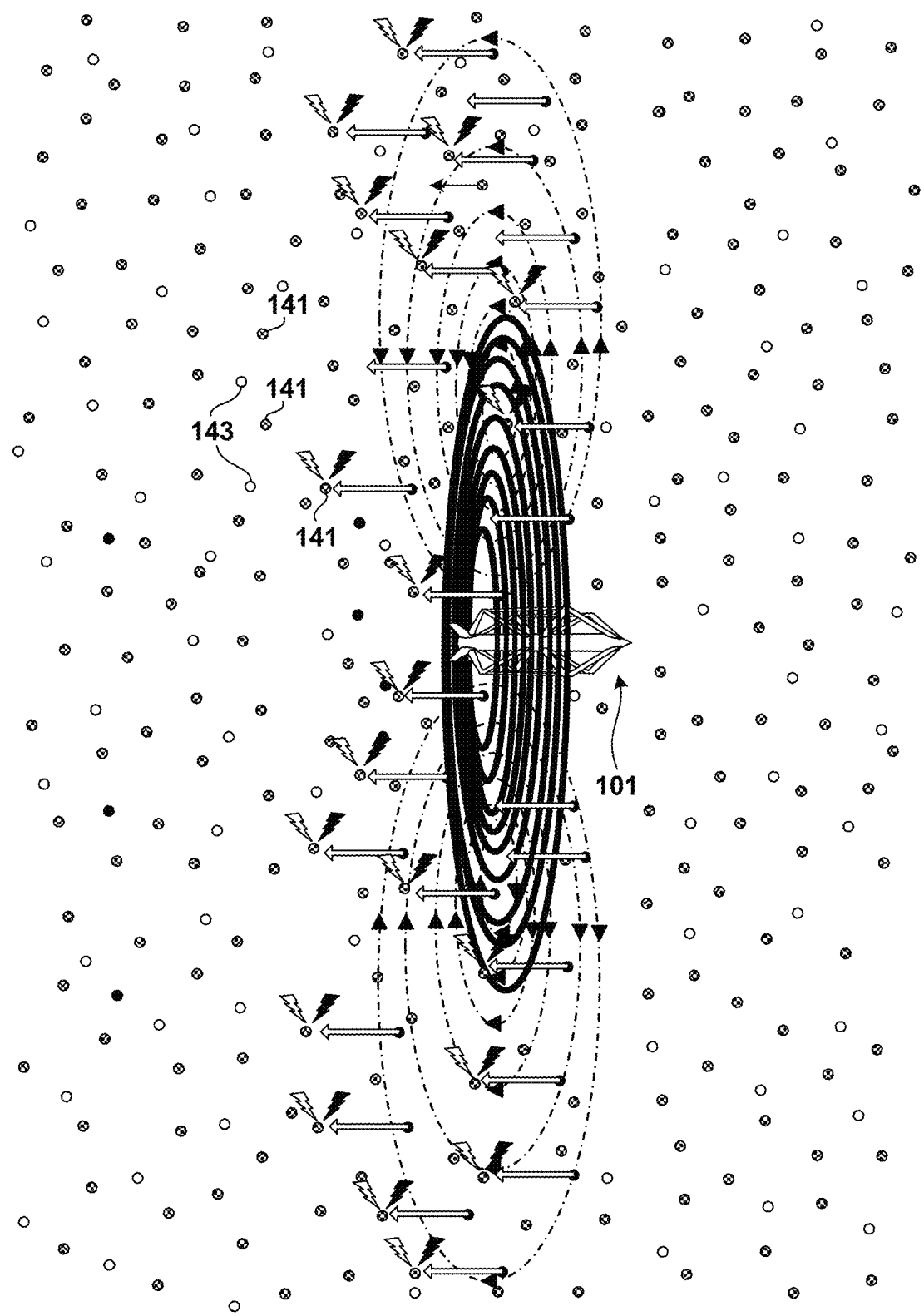
FIG. 10 illustrates the pushed ions colliding with neutral particles initiating a charge exchange, in accordance with embodiments of the present technology.

In a fluid that is a weakly-ionized plasma (characterized by an abundance of neutral particles, such as in Earth's ionosphere), the moving ions often collide with neutral particles initiating a charge exchange, as illustrated schematically in FIG. 10, which enhances total thrust. In particular, FIG. 10 illustrates moving ions 141 colliding with neutral particles 143. As a result of the collision, the neutral particles 143 become charged, while the originally-charged ions 141 are neutralized. The combined reaction mass of the (formerly) neutral particles 143 and the (formerly) ionized particles 141 imparts a thrust force on the flight vehicle 101. In this process momentum is conserved between the total reaction mass and the thrust force on the vehicle, and charge is conserved between the originally-charged ions 141 and the newly-charged neutral particles 143.

To recap the overall operation of any of the systems described above, the system 100 is activated by energizing the coil sets 110 in sequence. The first coil set 111 is energized, creating a magnetic field around the first coil set that extends to the external plasma. The first coil set 111 is then de-energized and, if the first coil set 111 retains electrical power, that power can be transferred into the second coil set 112. For example, if the first coil set 111 is composed of superconducting coils, the electrical current it carries can be transferred to the second coil set 112, e.g., via a wire or other conductive link. Since the peak field starts at one location (for example, toward the forward portion 102 of the vehicle 101), and then, as the energy transfers to the second coils 112, the location of the superposition of the resulting dipole fields translates to another location (for example, toward the aft portion 103 of the vehicle 101). The position of the dipole magnetic field, being the superposition of the magnetic fields from the two drive coil sets, smoothly varies from near the front of the vehicle to near the back of the vehicle, providing a dipole magnetic field that moves (translates) in space from front to back. Since the magnetic field extends to the external environment 140 (e.g., the plasma 144), the movement of the magnetic field from the first drive coil set 111 to the second drive coil set 112 pushes the external ions in the general aft direction of the second drive coil set 112, creating a thrust in the forward direction 116a.

Next, the second coil set 112 is then de-energized and electrical power in the second coil set 112 is moved into a storage facility, e.g., a third coil 113. The electrical power is then moved back to the first coil set, thereby re-creating the magnetic field at the first coil set, and the sequence repeats. As a result, the dipole magnetic field moves in just one direction, repeatedly pulsing or "sweeping" in the same direction. With each pulse, the magnetic field moves from the first coil set 111 to the second coil set 112 (pushing on ions in the external plasma), then the magnetic field moves into the third coil 113 (and thus no longer extends into the external plasma), then another pulse again pushes the external plasma from the first coil set 111 toward the second coil set 112. The sequence can continuously repeat with the magnetic field originating from the first coil set 111, translating to the second coil set 112, then again into the third coil 113, then again originating in the first coil set 111.

As discussed previously, the action of the coils on the surrounding plasma can create a retro or reverse thrust on the vehicle 101, e.g., by reversing the order of the sequence in which the coil sets are energized. For example, such a force (in the opposite or forward direction) can be created by energizing the second coil set 112, then de-energizing the second coil set 112 and energizing the first coil set 111, then de-energizing the first coil set 111 and energizing the third coil(s) 113, then de-energizing the third coil(s) 113 and energizing the second coil set 112. Putting it another way, when the sequence is to activate the forward drive coil first and the aft drive coil second, the vehicle accelerates in the forward direction. When the order is reversed, the vehicle decelerates in the forward direction, or accelerates in the rearward direction.

The operation described above was described in the context of motion along the thrust axis 115a. As discussed above, forces can be applied along other axes, in addition to, or in lieu of, the thrust axis 115a. For example, the flight vehicle 101 can have a lift axis 115b orthogonal to the thrust axis 115*a*. To provide forces along the lift axis 115*b*, coils of the type shown in FIG. 4B can be oriented along the lift axis 115*b*, rather than the thrust axis 115*a*. Accordingly, to generate lift, the first coil set is positioned toward the top of the vehicle 101, and the second coil set is positioned toward the bottom of the vehicle.

The process described above can take place on any number of suitable time scales. In a typical operation, the first coil set 111 is de-energized simultaneously with the second coil set 112 being energized. The de-energization process need not be complete for the first coil set before beginning the power transfer to the second coil set. For example, the first coil set 111 may still be partially energized while the second coil set 112 is more fully energized, and vice versa. In either embodiment, each powered coil set 111 and 112 generates a dipole magnetic field with a superposition at some location. As the power level of the first coil set 111 varies with respect to the second coil set 112, the location of the magnetic fields' superposition translates from closer to the first coil set 111 to closer to the second coil set 112. The translating superposition pushes on external ions, propelling and/or otherwise applying a force to the vehicle 101.

The length of time that each coil is energized can be selected to be compatible with the expected motion of the ions accelerated by the resulting magnetic fields. The foregoing times (and/or the amount of power supplied to the coils) can be adjusted to control the speed of the vehicle 101, and can be adjusted based upon environmental factors, for example, the density of charged particles in the local environment. Orbital vehicles will encounter a "headwind" or drag from hitting atmospheric particles. In an embodiment attempting to use thrust to balance this drag, the frequency at which the superposition of the dipole magnetic field sweeps from the first coil set 111 to the second coil set 112 can be chosen to create adequate thrust to move reaction mass of comparable momentum to the perceived "headwind", thereby balancing the drag from oncoming atmospheric particles.

Some energy will be lost because of the work done on the surrounding plasma and, in many embodiments, due to parasitic losses within the flight vehicle. To continue energizing the coils successively, a source of energy must be included. Accordingly, the power source 130 can be an onboard energy storage system (such as a battery or power generator). In one embodiment, batteries can be powered by solar-energy collectors onboard the flight vehicle. In another embodiment, the power source 130 can be or can include an artificial external source (e.g., located off the flight vehicle 101, for example as disclosed in the Whisper Beam reference). In one embodiment, some of the energy in each cycle is conserved by passing energy from the first coil set 111 to the second coil set 112, from the second coil set 112 to the storage coil 113, and from the storage coil 113 back to the first coil set 111, with additional energy provided, as needed, to maintain full operational power. In another embodiment, most or all energy is lost when each coil is de-energized, and most or all power is supplied by on-board energy storage or by an external energy source.

To change the direction of thrust, the axis of the coils can be re-oriented. As an analogy, a helicopter's rotor can be oriented to provide only lift during takeoff. Then the rotor can be reoriented (tilted), e.g., using a suitable mechanical pivoting system, to provide some forward thrust in addition to some lift. Similarly, the coils can be reoriented to provide thrust in one direction, then another. In another embodiment, separate sets of coils can be aligned along different axes, e.g., one set along the thrust axis and one along the lift axis (e.g., as described above with reference to the thrust and lift axis 115*a*, 115*b*). This approach can be used alone or in combination with re-orienting one (or more) sets of coils.

As described above, thrust is produced when the magnetic field pushes on external ions. While the originally-encountered ions produce thrust by themselves, that thrust may be negligible. Ions have some mass but the mass of ions in the ionosphere is typically very low compared to the mass of the neutral particles. Pushing the ions alone would provide a reaction force (e.g., thrust), but it would be a low level of thrust, due to the low mass flow. Ion collisions with neutral particles, however, result in a cascade charge exchange, which increases the number of ionized particles swept by the magnetic field's translating superposition. Pushing the newly-ionized particles (in addition to the originally-encountered ions) means a far higher mass is moved. The higher the mass flow, the higher the thrust (or other applied force).

The ratio of ions to neutral particles depends on the environment. Returning briefly to FIG. 2, in the low atmosphere, there are virtually no ions, and many neutral particles. In the ionosphere, there may be thousands to tens of thousands of neutral particles for every ion. In most parts of interplanetary space (in the flow of the solar wind) there are ions, but few or no neutral particles. Below the ionosphere, a power source can be used to artificially ionize particles, thereby raising the ratio of ionized particles to neutral particles. As a result, embodiments of the present technology can be used for thrusting at altitudes far below the ionosphere. If adequate power is available (for example, from an external power source as described in the Whisper Beam reference), artificially ionizing air in the lower atmosphere can be used to raise a vehicle from the ground to the ionosphere.

I. Thrust Vector Control

Figure 12:
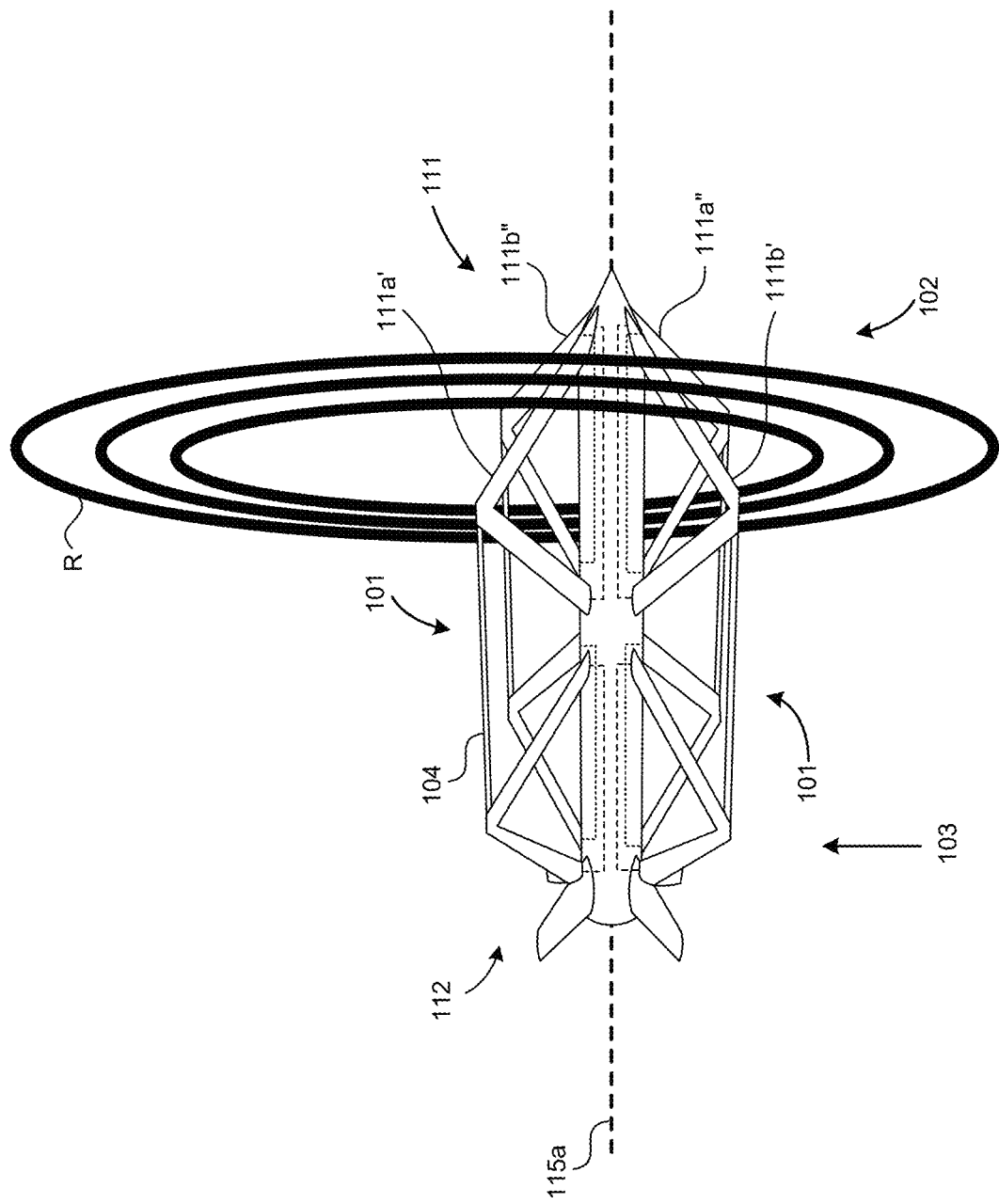
FIG. 12 is a partially schematic, isometric illustration of a vehicle having coils configured to generate off-axis forces in accordance with embodiments of the present technology.

One technique for vectoring the vehicle thrust is to include coils or coil sets on axes that are transverse to the thrust axis. Another technique is to apply a different level of power to coil(s) on one side of the thrust axis, relative to coils on another side of the thrust axis. FIG. 12 is a partially schematic illustration of a vehicle 101 configured in accordance with the present technology in a manner to provide thrust vectoring off the primary thrust axis 115*a* using this technique. Generally speaking, each of the coils 111, 112 described previously herein is split into two. In the configuration shown in FIG. 12, each coil therefore has an approximately triangular shape, with one leg of the triangle for each coil shown in dashed lines. The result is four first coils 111 at the forward portion 102 of the vehicle 101, and four second coils 112 at the aft portion 103 of the vehicle 101. For purposes of illustration, only the multiple first coils 111 are individually referenced, as first coils 111*a*', 111*a*", 111*b*', and 111*b*". By individually controlling coils on each side of the thrust axis 115*a* (for example, coils 111*a*', 111*b*" on one side of the axis, and 111*a*", 111*b*' on the other side of the axis), the relative position of the vehicle 101 within the electrical current rings R shifts, e.g., upwardly or downwardly in the plane of FIG. 12 and/or inwardly/outwardly from the plane, depending on which coils are energized, and/or a differential in energy levels applied to the coils. As a result of this shift, the force applied to the flight vehicle 101 is no longer aligned with the thrust axis 115*a* and accordingly, the vehicle 101 can be thrust vectored off the primary thrust axis 115*a*. For example, as shown in FIG. 12, the differential thrust has pushed the vehicle downward. Although not shown in FIG. 12, by applying the force away from the center of mass, the vehicle can also be yawed as a result of the differential thrust. Accordingly, this approach can be used to direct the vehicle 101 in any off-axis direction and/or provide for small course corrections.

J. Additional Circumferential Coils to Enhance Collisions

Kirtley (see Reference 13 under Heading 3) discusses adding a third, circumferential, coil to an orthogonal coil set generating a rotating magnetic field. The circumferential coil generates a static magnetic field in the plasma, which can enhance the collisional charge exchange between ions and neutral particles when a non-translating magnetic field is used to create drag force on a vehicle moving through a weakly-ionized plasma.

This circumferential coil can also be used to enhance charge exchange of a translating dipole magnetic field, a representative embodiment of which is shown in FIG. 11A. In this embodiment the rotating magnetic field is formed using an orthogonal coil set, similar to the embodiment discussed above with reference to FIG. 4B. Similar to the prior embodiment: (i) the first orthogonal drive coil set 111 generates a rotating magnetic field, which in turn generates a dipole magnetic field extending into the plasma, then (ii) energy is transferred to the second orthogonal drive coil set 112, translating the superposition of the rotating magnetic field aft, and with it, the superposition of the dipole magnetic field translates aft, pushing on electrons in the plasma which collide with neutral particles causing charge exchange. The additional circumferential coils 118 and 119 shown in FIG. 11A generate a static magnetic field that enhances this charge exchange, enhancing the total reaction mass and with it total thrust. These additional circumferential coils 118 and 119 can be circular (as shown in FIG. 11A) or can have other shapes.

K. Additional Circumferential Coil(s) to Enhance Artificial Ionization

The system described can also operate in a neutral environment such as below the ionosphere.

In a representative embodiment, the vehicle 101 can ionize neutral particles in the surrounding atmosphere to create or enhance an external ionized field. This operation mode can be used, for example, when operating in a neutral environment with little or no surrounding plasma, such as Earth's atmosphere below the ionosphere. As noted above, in the transitional region below ~85 km altitude, the low-pressure atmosphere can be artificially ionized by expending some additional energy (via widely-known methods such as a electron cyclotron residence microwave discharge (ECR) or other suitable approach), thereby extending plasma propulsion techniques to a neutral atmosphere or enhancing plasma propulsion techniques in a weakly-ionized region.

FIG. 11B is a partially schematic, isometric illustration of another embodiment of a flight vehicle 101 with the addition of a further circumferential coil 117 (illustrated as circular in this embodiment, though other shapes are possible) between the first drive coil set 111 and the second drive coil set 112.

In forming the rotating magnetic field that translates from the first drive coil set 111 at the forward portion 102 to the second drive coil set 112 at the aft portion, an embodiment can include an additional circumferential coil 117. This additional circumferential coil 117 can pair with the forward circumferential coil 118, operating as a Helmholtz coil pair to contain a static magnetic field near the forward portion of the vehicle 102. In particular, a suitable process (e.g., a microwave, spark, and/or corona process) can be used to generate ions within the region between the two circumferential coils 117, 118, and the coils 117, 118 can confine the locally ionized field to the forward region 102 of the vehicle. The additional ionization can provide for additional reaction mass, either via the ions directly, or via a charge transfer from the ions to neutral particles. In either case, the resulting thrust is increased.

The circumferential coils 117-119 can be supported by the braces or supports 104, and/or via additional support elements. In embodiments for which the vehicle 101 is exposed to high dynamic pressures, the circumferential coils 117-119 can provide support (in some cases, necessary support) for the first and second coils 111, 112.

In yet a further aspect of the configuration shown in FIG. 11B, an external power source 130 (e.g., of the type described in the Whisper Beam reference) can act directly on air molecules in the region between the circumferential coils 117, 118. The frequency of the power provided by the external power source 130 can be tuned to the resonant frequency of the air molecules in the environment 140 to improve the efficiency with which those molecules are ionized. The foregoing technique can be used to increase the ionization of an existing plasma, and/or create a plasma in cases for which no plasma exists. In either case, the ability of the vehicle to derive thrust from the local environment can be increased.

3. Ion Implantation And Other Deposition

Figure 13:
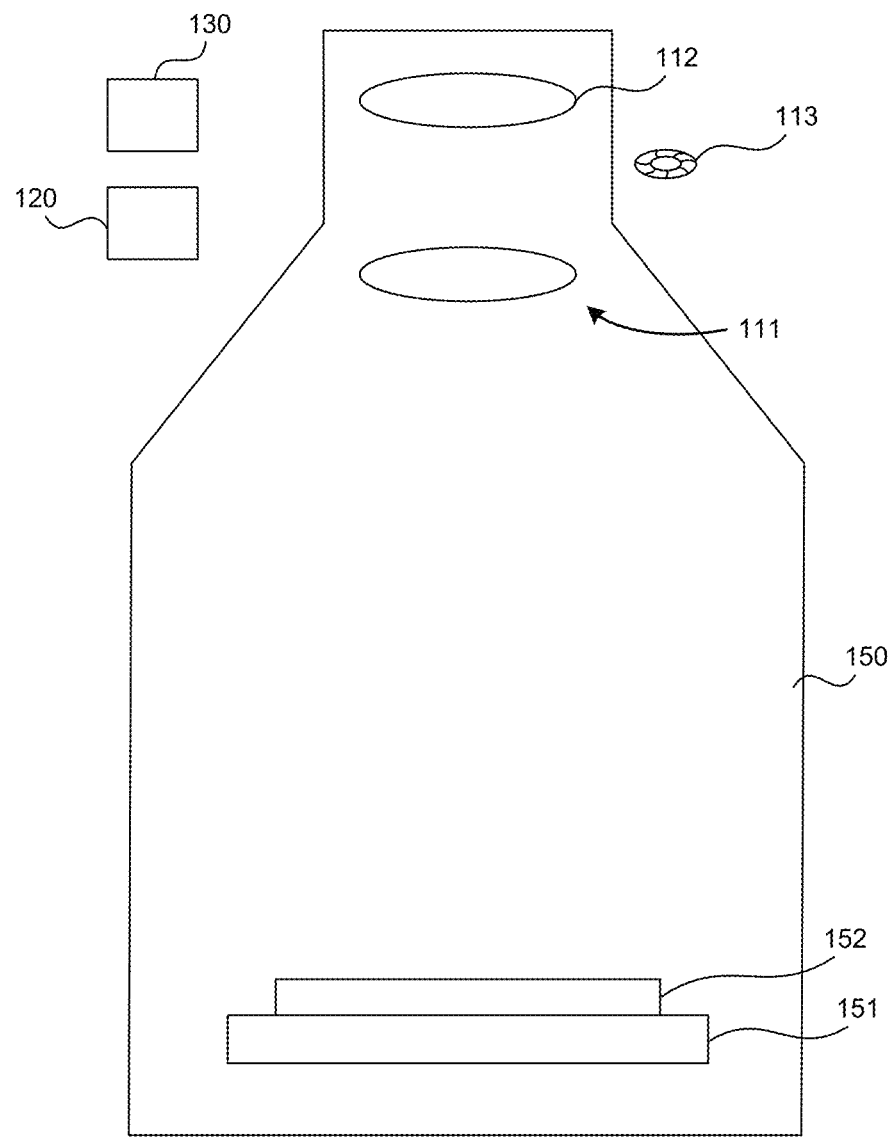
FIG. 13 is a partially schematic illustration of an arrangement of coils used for directing particles toward a target object in accordance with embodiments of the present technology.

Several embodiments of the presently disclosed technology were described above in the context of a flight vehicle. In other embodiments, similar configurations can be used to shift the momentum of charged particles in manners that produce results other than motion. For example, as shown in FIG. 13, a representative system 100 can include a chamber 150 housing a support 151 carrying a target material 152. The first and second drive coil(s) 111, 112, and the storage coil 113 can be positioned to direct particles to the target 152, for example, to coat the surface of the target, and/or implant ions in the target 152. This operation can be conducted via power received from the power source 130, and can be controlled via the controller 120, in a manner generally similar to those discussed above.

From the foregoing, it will be appreciated that specific embodiments of the disclosed technology have been described herein for purposes of illustration, but that various modifications may be made without deviating from the technology. For example, several embodiments of the presently disclosed technology were described in the context of propulsion systems for flight vehicles. In other embodiments, similar systems can be used to perform other functions, for example, the chemical coating/implantation processes described above, as well as other suitable processes that benefit from the controlled magnetic fields in ionized plasmas described herein.

The systems described herein can be used to generate forces along any suitable axis or combination of axes. While representative coil sets each include two coils, the coil sets can have other numbers of coils as well (e.g., one coil, or more than two coils). In another example, the storage coil(s) described above can be eliminated. Instead, while generally not an efficient operation mode, current can be supplied to the first drive coil(s), then to the second drive coil(s) to generate a force. After the force has been generated, additional power can be supplied to the first and second drive coils, without storing energy in a storage coil.

Certain aspects of the technology described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

To the extent any materials incorporated herein by reference conflict with the present disclosure, the present disclosure controls.

As used herein, the terms "about," "generally," and "approximately," refer to values within 10% of the stated value. The term "and/or," as in "A and/or B," refers to A alone, B alone, and both A and B.

The following examples provide representative embodiments of the disclosed technology:

1. A system for moving ions in a plasma, comprising:
   a plurality of coils, the coils including:
      a first drive coil positioned along a force axis;
      a second drive coil positioned along the force axis and spaced apart from the first drive coil;
      a storage coil that is magnetically shielded; and
   a controller operatively coupled to the coil and configured to:
      (a) increase energy to the first drive coil to generate a magnetic field in a portion of the plasma adjacent to the first drive coil;
      (b) decrease energy to the first drive coil and increase energy to the second drive coil to translate the resulting superposed magnetic field through the plasma to a position adjacent the second drive coil; and
      (c) transfer energy from the second drive coil to the storage coil and decrease energy to the second drive coil to reduce the magnetic field in the plasma.

2. The system of example 1, further comprising, following process (c), repeating processes (a)-(c).

3. The system of example 2 wherein repeating process (a) includes transferring energy from the storage coil to the first drive coil.

4. The system of example 2 wherein translating the magnetic field includes moving ions in the plasma as a reaction mass, to impart a force on the first and second drive coils along the force axis, in a direction from the second drive coil to the first drive coil.

5. The system of any of examples 1-4 wherein the coils are carried by a flight vehicle to create a force on the flight vehicle.

6. The system of example 5 wherein the force axis is aligned with a thrust axis of the flight vehicle.

7. The system of example 5 wherein the force axis is oriented at a non-zero angle relative to a thrust axis of the flight vehicle.

8. The system of any of examples 1-7 wherein the coils are positioned to direct ions in the plasma toward a target material in a chamber to treat the target material along the force axis.

9. A flight vehicle system, comprising:
   a plurality of coils, coupleable to a flight vehicle, the coils including:
      a first drive coil positioned along a vehicle force axis;
      a second drive coil positioned along the vehicle force axis and spaced apart from the first drive coil;
      a storage coil that is magnetically shielded; and
   a controller operatively coupled to the coils, and configured to the coils, and configured to:
      (a) increase energy to the first drive coil to generate a magnetic field in a portion of the plasma adjacent to the first drive coil;
      (b) decrease energy to the first drive coil and increase energy to the second drive coil to translate the resulting superposed magnetic field through the plasma to a position adjacent the second drive coil; and
      (c) transfer energy from the second drive coil to the storage coil and decrease energy to the second drive coil to reduce the magnetic field in the plasma.

10. The system of example 9, further comprising, following process (c), repeating processes (a)-(c).

11. The system of example 10 wherein repeating process (a) includes transferring energy from the storage coil to the first drive coil.

12. The system of example 10 wherein translating the magnetic field includes moving ions in the plasma as a reaction mass, to impart a force on the first and second coils along the force axis, in a direction from the second drive coil to the first drive coil.

13. The system of any of examples 9-12 wherein the force axis is positioned to align with a thrust axis of the flight vehicle.

14. The system of any of examples 9-12 wherein the force axis is oriented at a non-zero angle relative to a thrust axis of the flight vehicle.

15. The system of any of examples 9-14 wherein:
   increasing energy to the first coil includes changing a state of the first coil from a de-energized state to an energized state; and
   decreasing energy to the first coil includes changing a state of the first coil from an energized state to a de-energized state.

16. The system of any of examples 9-14 wherein the energy is decreased to the first coil simultaneously with the energy being increased to the second coil.

17. The system of example 16 wherein energy is transferred from the first coil to the second coil.

18. The system of any of examples 9-17 wherein at least one of the first coil or the second coil has a generally rectilinear shape.

19. The system of example 18 wherein the first and second coils each have a diamond shape, and wherein the system further comprises a brace supporting one of the coils relative to the other.

20. The system of any of examples 9-19 wherein the gap between the first and second coils is smaller than a maximum cross-sectional dimension of at least one of the first and second coils.

21. The system of any of examples 9-20 wherein the first coil is one of at least two first coils, and wherein at least two of the first coils are oriented orthogonal to each other.

22. The propulsion system of any of examples 9-21 wherein:
   the first coil is one of at least two first coils that are not co-planar with each other;

the second coil is one of at least two second coils that are not co-planar with each other;

the second coils are positioned aft of the first coils along the vehicle force axis; and wherein the controller is configured to:
energize the first coils in a rotational sequence about the vehicle force axis to generate the magnetic field; and
energize the second coils in a rotational sequence about the vehicle force axis to translate magnetic field.

23. The system of any of examples 9-22 wherein the plurality of coils further comprises a fourth coil, and a fifth coil positioned adjacent to the first coil and configured to operate as a Helmholtz coil pair to support a static magnetic field in a region adjacent to the first coil.

24. The system of example 23 wherein the controller is configured to tune a frequency of energy provided to at least one of the coils to a resonant frequency of molecules adjacent the coils.

25. The system of any of examples 9-24, further comprising the flight vehicle, and wherein the coils are carried by the flight vehicle.

26. The system of any of examples 9-25 wherein the first coil is one of two first coils, one positioned on one side of the force axis, and the other positioned on another side of the force axis, and wherein the controller is configured to apply power to the two first coils differentially to create a force that is not aligned with the force axis.

27. A method for generating a force, comprising:
(a) increasing energy to a first coil to generate a magnetic field in a portion of the plasma adjacent to a first coil, the first coil being positioned along a force axis;
(b) decreasing energy to the first coil and increasing energy to a second coil to translate the resulting superposed magnetic field through the plasma to a position adjacent the second coil, the second coil being positioned along the force axis and spaced apart from the first coil; and
(c) transferring energy from the second coil to a third coil and decreasing energy to the second coil to reduce the magnetic field in the plasma.

28. The method of example 27, further comprising, following process (c), repeating processes (a)-(c).

29. The method of example 28 wherein repeating process (a) includes transferring energy from the third coil to the first coil.

30. The method of example 28 wherein translating the magnetic field includes moving ions in the plasma as a reaction mass, to impart a force on the first and second coils along the force axis, in a direction from the second coil to the first coil.

31. The method of example 27 wherein the coils are carried by a flight vehicle to create a force on the flight vehicle.

32. The method of example 31 wherein the force axis is aligned with a thrust axis of the flight vehicle.

33. The method of example 31 wherein the force axis is oriented at a non-zero angle relative to a thrust axis of the flight vehicle.

34. The method of example 27 wherein the coils are positioned to direct the plasma toward a target material in a chemical vapor deposition (CVD) chamber, and wherein translating the magnetic field accelerates particles toward the target material.

35. A method for applying a force to a flight vehicle, comprising:
(a) increasing energy to a first coil to generate a magnetic field in a portion of a plasma adjacent to the first coil, the first coil being carried by the flight vehicle, and being positioned along a force axis;
(b) decreasing energy to the first coil and increasing energy to a second coil to translate the magnetic field through the plasma to a position adjacent the second coil, the second coil being carried by the flight vehicle, and being positioned along the force axis and spaced apart from the first coil; and
(c) transferring energy from the second coil to a third coil and decreasing energy to the second coil to reduce the magnetic field in the plasma, the third coil being carried by the flight vehicle.

36. The method of example 35 wherein the force axis is aligned with a thrust axis of the flight vehicle.

37. The method of example 35 wherein the force axis is aligned with a lift axis of the flight vehicle.

38. The method of example 35 wherein the flight vehicle is located in the lower atmosphere when processes (a)-(c) are performed, and wherein the method further comprises ionizing neutral particles in a region adjacent to the flight vehicle.

39. The method of example 38 wherein ionizing the neutral particles includes ionizing the neutral particles via a fourth coil.

40. The method of example 39 The method of claim 38, further comprising containing the ionized particles via a fourth coil and a fifth coil that form a Helmholtz coil pair adjacent to the first coil.

41. The method of example 36 wherein the first coil is one of two first coils, one positioned on one side of the force axis, and the other positioned on another side of the force axis, and wherein the method further comprises applying power to the two first coils differentially to create a force that is not aligned with the force axis.

42. The method of example 36 wherein the first coil is one of multiple first coils positioned around the thrust axis, and wherein the method further comprises powering individual first coils sequentially to produce a rotating electron current around the first coils.

4. Published References

1) R. Zubrin, Dipole Drive for Space Propulsion, JBIS, 70 (2017), pp. 442-448.
2) David Szondy, MIT researchers study electro-hydrodynamic thrust, New Atlas (8 Apr. 2013).
3) Kirtley, "Pulsed Plasmoid Propulsion," IEPC-2011
4) Jeffrey Greason, A Reaction Drive, JBIS 72 (May 2019), pp. 146-152.
5) John Slough, The Plasma Magnet, NASA Institute for Advanced Concepts Phase I Final Report (2004).
6) John Slough, The Plasma Magnet, NASA Institute for Advanced Concepts Phase II Final Report (2005).
7) John Slough, The Plasma Magnet for Sailing the Solar Wind, AIP Conference Proceedings 746, 1171 (2005).
8) John Slough, High Beta Plasma for Inflation of a Dipolar Magnetic Field as a Magnetic Sail, IEPC-01-202.
9) John Slough & Louis Giersch, The Plasma Magnet, AIAA 2005-4461, Aerospace Research Council (19 Jun. 2012).
10) David Kirtley, John Slough, Chris Pihl, Eric Meier and Richard Milroy, Pulsed Plasmoid Propulsion: Air-Breathing Electromagnetic Propulsion, IEPC-2011-015.
11) John Slough, Plasma Magneto-Shell Aerocapture for Manned Mars Missions and Planetary Deep Space Orbiters, APS Gaseous Electronics Conference (2018).
12) John Slough, David Kirtley, and Anthony Pancotti, Plasma Magnetoshell for Aerobraking and Aerocapture, IEPC-2011-304, presented at the 32nd International Electric Propulsion Conference, Wiesbaden, Germany 11-15 Sep. 2011

13) David Kirtley, A Plasma Aerocapture and Entry System for Manned Missions and Planetary Dep Space Orbiters, NASA Institute for Advanced Concepts (NIAC) Phase I Final Report, Contract number NNX12AR12G (25 Mar. 2019)

14) D. Di Cara, J. Gonzalex del Amo, A. Santovincenzo, B. Carnicero Dominguez, M. Arcioni A. Caldwell, and I. Roma, RAM Electric Propulsion for Low Earth Orbit Operation: an ESA study, *30th International Electric Propulsion Conference, Florence, Italy* (17-20 Sep. 2007); *The European Space Agency, World-first firing of air-breathing electric thruster press release* (3 May 2018).

15) See, e.g., Dan Ye, Jun Li and Jau Tang, Jet propulsion by microwave air plasma in the atmosphere, *AIP Advances* 10, 055002 (2020).

I claim:

1. A system for generating thrust for a vehicle in a plasma, the system comprising:
   a plurality of coil sets, the plurality of coil sets including:
     a first drive coil set positioned along a force axis, the first drive coil set comprising one or more first drive coils extending away from the force axis to a first maximum distance from the force axis along a direction perpendicular to the force axis;
     a second drive coil set positioned along the force axis and spaced apart from the first drive coil set, the second drive coil set comprising one or more second drive coils extending away from the force axis to a second maximum distance from the force axis along the direction perpendicular to the force axis;
   and a controller operatively coupled to the plurality of coil sets and configured to:
     (a) increase energy to the first drive coil set to generate a magnetic field in a portion of the plasma adjacent to and external to the first drive coil set, wherein the magnetic field extends away from the force axis by a distance greater than the first maximum distance;
     (b) decrease energy to the first drive coil set and increase energy to the second drive coil set to translate a resulting superposed magnetic field through the plasma to a position adjacent to and external to the second drive coil set, wherein translating the resulting superposed magnetic field moves ions in the plasma along the force axis to thereby generate a force along the force axis;
     (c) decrease energy to the second drive coil set to reduce the magnetic field in the plasma; then
     (d) repeat (a) through (c);
   wherein a majority of the ions moved in the plasma by the system during (b) are spaced apart from the force axis along the axis that is perpendicular to the force axis by a distance greater than the first maximum distance and greater than the second maximum distance.

2. The system of claim 1, further comprising a storage coil.

3. The system of claim 2, wherein (c) comprises transferring energy from the second drive coil set to the storage coil, and wherein repeating (a) includes transferring energy from the storage coil to the first drive coil set.

4. The system of claim 2, wherein the storage coil is magnetically shielded.

5. The system of claim 1, further comprising the vehicle, wherein the vehicle carries the plurality of coil sets, wherein operation of the plurality of coil sets generates the thrust for the vehicle.

6. The system of claim 5, wherein the force axis is aligned with a thrust axis of the vehicle.

7. The system of claim 5 wherein the force axis is oriented at a non-zero angle relative to a thrust axis of the vehicle.

8. The system of claim 1, wherein the first drive coil set comprises at least two first drive coils, wherein a first of the two first drive coils is oriented orthogonal to a second of the two first drive coils.

9. The system of claim 1, wherein the second drive coil set comprises at least two second drive coils, wherein a first of the two second drive coils is oriented orthogonal to a second of the two second drive coils.

10. A vehicle system for generating thrust for a vehicle in a plasma, the system comprising:
    a plurality of coil sets, coupleable to the vehicle, the plurality of coil sets including:
      a first drive coil set positionable along a vehicle force axis, wherein the first drive coil set comprises one or more first drive coils;
      a second drive coil set positionable along the vehicle force axis and spaced apart from the first drive coil set, wherein the second drive coil set comprises one or more second drive coils;
    and a controller operatively coupled to the plurality of coil sets, and configured to:
      (a) increase energy to the first drive coil set to generate a magnetic field in a portion of the plasma adjacent to and at least partially external to the first drive coil set;
      (b) decrease energy to the first drive coil set and increase energy to the second drive coil set to translate a resulting superposed magnetic field through the plasma to a position adjacent to and at least partially external to the second drive coil set, wherein translating the resulting superposed magnetic field includes moving ions of the plasma along the force axis to impart a force on the vehicle along the force axis in a direction from the second drive coil set to the first drive coil set;
      (c) decrease energy to the second drive coil set to reduce the magnetic field in the plasma; and
      (d) repeat (a) through (c);
    wherein the first drive coil set and the second drive coil set generate currents carried by the plasma that extend away from the force axis beyond a periphery of each of the first drive coil set and the second drive coil set, and wherein a majority of the ions moved in the plasma during (b) are outside of a maximum radial extent of the first drive coil set and a maximum radial extent of the second drive coil set.

11. The vehicle system of claim 10, further comprising a storage coil.

12. The vehicle system of claim 11, wherein (c) comprises transferring energy from the second drive coil set to the storage coil, and wherein repeating (a) includes transferring energy from the storage coil to the first drive coil set.

13. The system of claim 11, wherein the storage coil is magnetically shielded.

14. The vehicle system of claim 10 wherein the force axis is positionable to align with a thrust axis of the vehicle.

15. The vehicle system of claim 10 wherein the force axis is oriented at a non-zero angle relative to a thrust axis of the vehicle.

16. The vehicle system of claim 10 wherein:
increasing energy to the first drive coil set includes changing a state of the first drive coil set from a de-energized state to an energized state; and
decreasing energy to the first drive coil set includes changing the state of the first drive coil set from an energized state to a de-energized state.

17. The vehicle system of claim 10 wherein the energy is decreased to the first drive coil set simultaneously with the energy being increased to the second drive coil set.

18. The vehicle system of claim 17 wherein energy is transferred from the first drive coil set to the second drive coil set.

19. The vehicle system of claim 10 wherein at least one first drive coil of the first drive coil set or at least one second drive coil of the second drive coil set has a rectilinear shape.

20. The vehicle system of claim 19 wherein a first drive coil of the first drive coil set has a diamond shape, a second drive coil of the second drive coil set has another diamond shape, and wherein the vehicle system further comprises a brace supporting one of the first drive coil or the second drive coil relative to the other.

21. The vehicle system of claim 10 wherein a first drive coil of the first drive coil set is spaced apart from a second drive coil of the second drive coil set by a distance that is smaller than a maximum cross-sectional dimension of at least one of the first drive coil of the first drive coil set or the second drive coil of the second drive coil set.

22. The vehicle system of claim 10 wherein the first drive coil set comprises at least two first drive coils, and wherein the second drive coil set comprises at least two second drive coils.

23. The vehicle system of claim 22, wherein two of the first drive coils are oriented orthogonal to each other, and wherein two of the second drive coils are oriented orthogonal to each other.

24. The vehicle system of claim 10 wherein:
the first drive coil set comprises at least two first drive coils that are not co-planar with each other;
the second drive coil set comprises at least two second drive coils that are not co-planar with each other;
the second drive coil set is positioned aft of the first drive coil set along the vehicle force axis; and
wherein the controller is configured to:
energize the at least two first drive coils in a first rotational sequence about the vehicle force axis to generate the magnetic field; and
energize the at least two second drive coils in a second rotational sequence about the vehicle force axis to translate the magnetic field.

25. The vehicle system of claim 10 wherein the plurality of coil sets further comprises a third coil set, and a fourth coil set positioned adjacent to the first drive coil set and configured to operate as a Helmholtz coil pair to support a static magnetic field in a region adjacent to the first drive coil set.

26. The vehicle system of claim 25 wherein the controller is configured to tune a frequency of energy provided to at least one coil set of the plurality of coil sets to a resonant frequency of molecules adjacent the plurality of coil sets.

27. The vehicle system of claim 10, further comprising the vehicle, and wherein the plurality of coil sets are carried by the vehicle.

28. The vehicle system of claim 10 wherein the first drive coil set is one of two first drive coil sets, one first drive coil set of the two first drive coil sets is positioned on one side of the force axis, and an other drive coil set of the two first drive coil sets is positioned on another side of the force axis, and wherein the controller is configured to apply power to the one first drive coil set and the other drive coil set of the two first drive coil sets differentially to create a force that is not aligned with the force axis.

* * * * *